(12) United States Patent
Totani et al.

(10) Patent No.: US 8,100,431 B2
(45) Date of Patent: Jan. 24, 2012

(54) FRONT PASSENGER SEAT AIRBAG APPARATUS

(75) Inventors: Chiharu Totani, Aichi-ken (JP); Masayuki Kitashiba, Aichi-ken (JP); Junichi Fujita, Aichi-ken (JP); Hikaru Ando, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 218 days.

(21) Appl. No.: 12/654,693

(22) Filed: Dec. 29, 2009

(65) Prior Publication Data
US 2010/0194082 A1 Aug. 5, 2010

(30) Foreign Application Priority Data
Jan. 30, 2009 (JP) .................................. 2009-019147

(51) Int. Cl.
*B60R 21/2165* (2011.01)
*B60R 21/205* (2011.01)
(52) U.S. Cl. .................................. 280/728.3; 280/732
(58) Field of Classification Search .................. 280/732, 280/728.3
See application file for complete search history.

(56) References Cited

U.S. PATENT DOCUMENTS

| | | | | |
|---|---|---|---|---|
| 4,903,986 A * | 2/1990 | Cok et al. | .................... | 280/728.2 |
| 5,013,064 A * | 5/1991 | Miller et al. | ................ | 280/730.1 |
| 5,174,602 A * | 12/1992 | Nakayama et al. | ........ | 280/728.3 |
| 6,168,189 B1 * | 1/2001 | Dennis | ....................... | 280/728.3 |
| 6,505,850 B2 * | 1/2003 | Helfrich et al. | ............ | 280/728.3 |
| 6,540,252 B2 * | 4/2003 | Mu et al. | ..................... | 280/728.3 |
| 6,793,238 B2 * | 9/2004 | Schneider et al. | ......... | 280/728.3 |
| 6,848,705 B2 * | 2/2005 | Schneider et al. | ......... | 280/728.3 |
| 7,770,916 B2 * | 8/2010 | Okumura et al. | .......... | 280/728.3 |
| 7,806,430 B2 * | 10/2010 | Cowelchuk et al. | ....... | 280/728.3 |
| 2003/0178818 A1 * | 9/2003 | Schneider et al. | ......... | 280/728.3 |
| 2003/0178819 A1 * | 9/2003 | Schneider et al. | ......... | 280/728.3 |
| 2008/0012273 A1 * | 1/2008 | Cowelchuk et al. | ....... | 280/728.3 |

FOREIGN PATENT DOCUMENTS
JP A-2008-037282 2/2008
* cited by examiner

*Primary Examiner* — Eric Culbreth
*Assistant Examiner* — Barry Gooden, Jr.
(74) *Attorney, Agent, or Firm* — Posz Law Group, PLC

(57) ABSTRACT

A split-opening portion is formed by two transverse breakable portions that extend substantially along the transverse direction of a vehicle, two front-rear breakable portions that extend substantially along the front-rear direction of the vehicle and are connected to the transverse breakable portions, and a middle breakable portion that is located between the two transverse breakable portions and extends substantially along the transverse direction of the vehicle. The middle breakable portion is connected to the front-rear breakable portions. In a front passenger seat airbag apparatus, the split-opening portion is broken by pressing force of an inflated airbag so that door portions are separated from the door adjacent portion, and the door support portions are pivoted together with the door portions about hinge portions serving as fulcrums. The breaking strengths of parts of the split-opening portion are varied such that is broken in the order of the transverse breakable portions, the front-rear breakable portions, and the middle breakable portion.

6 Claims, 16 Drawing Sheets

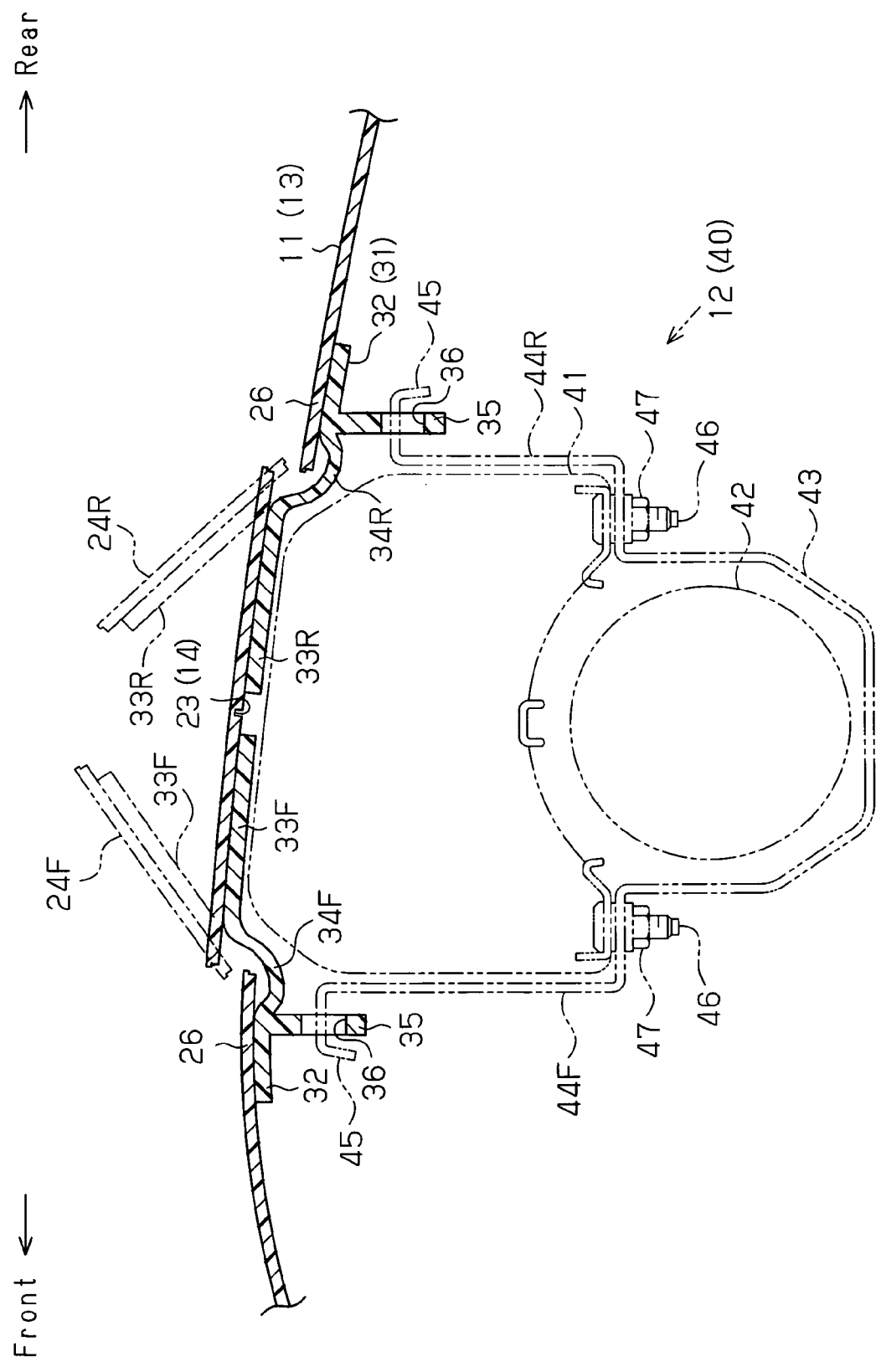

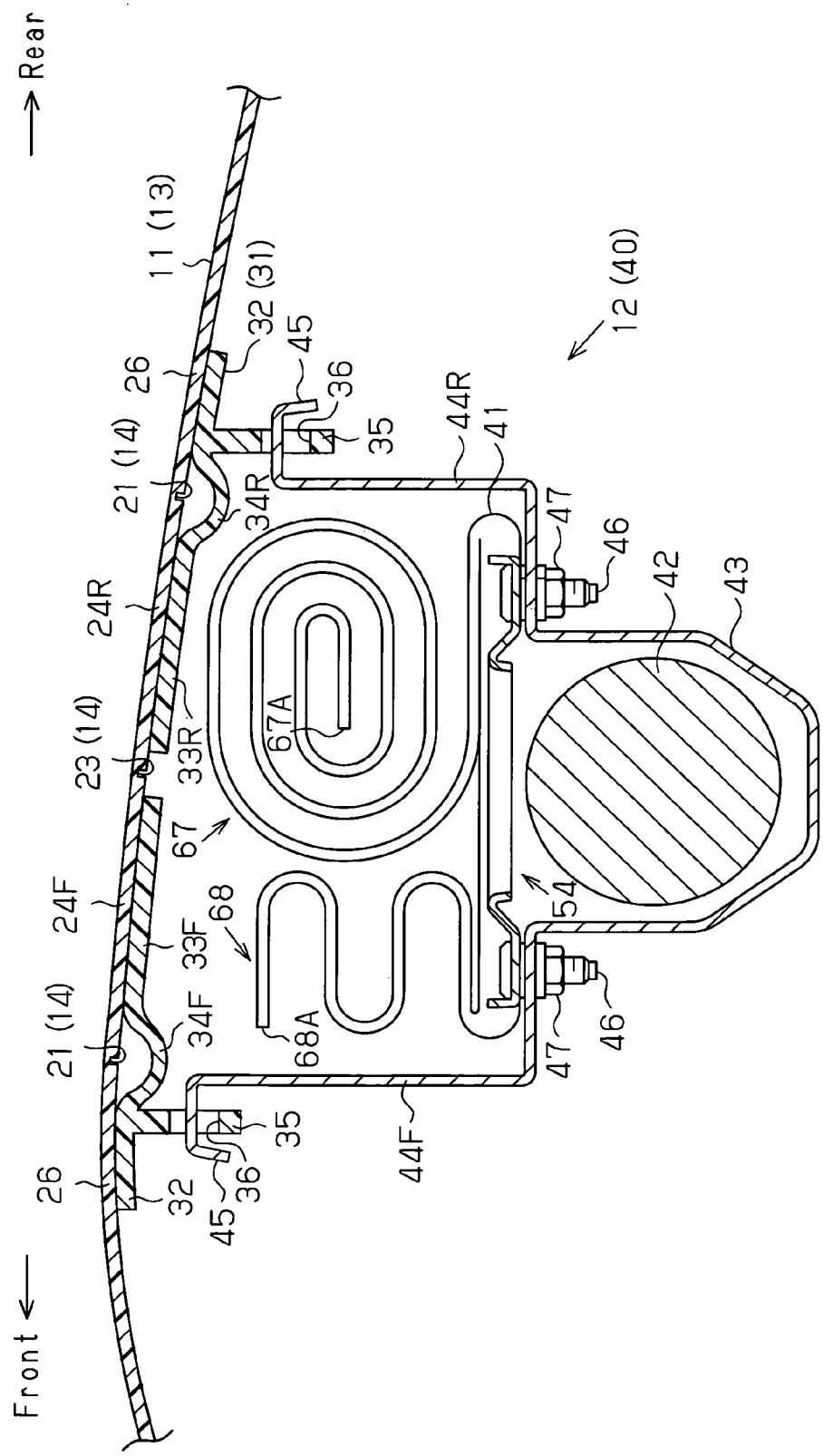

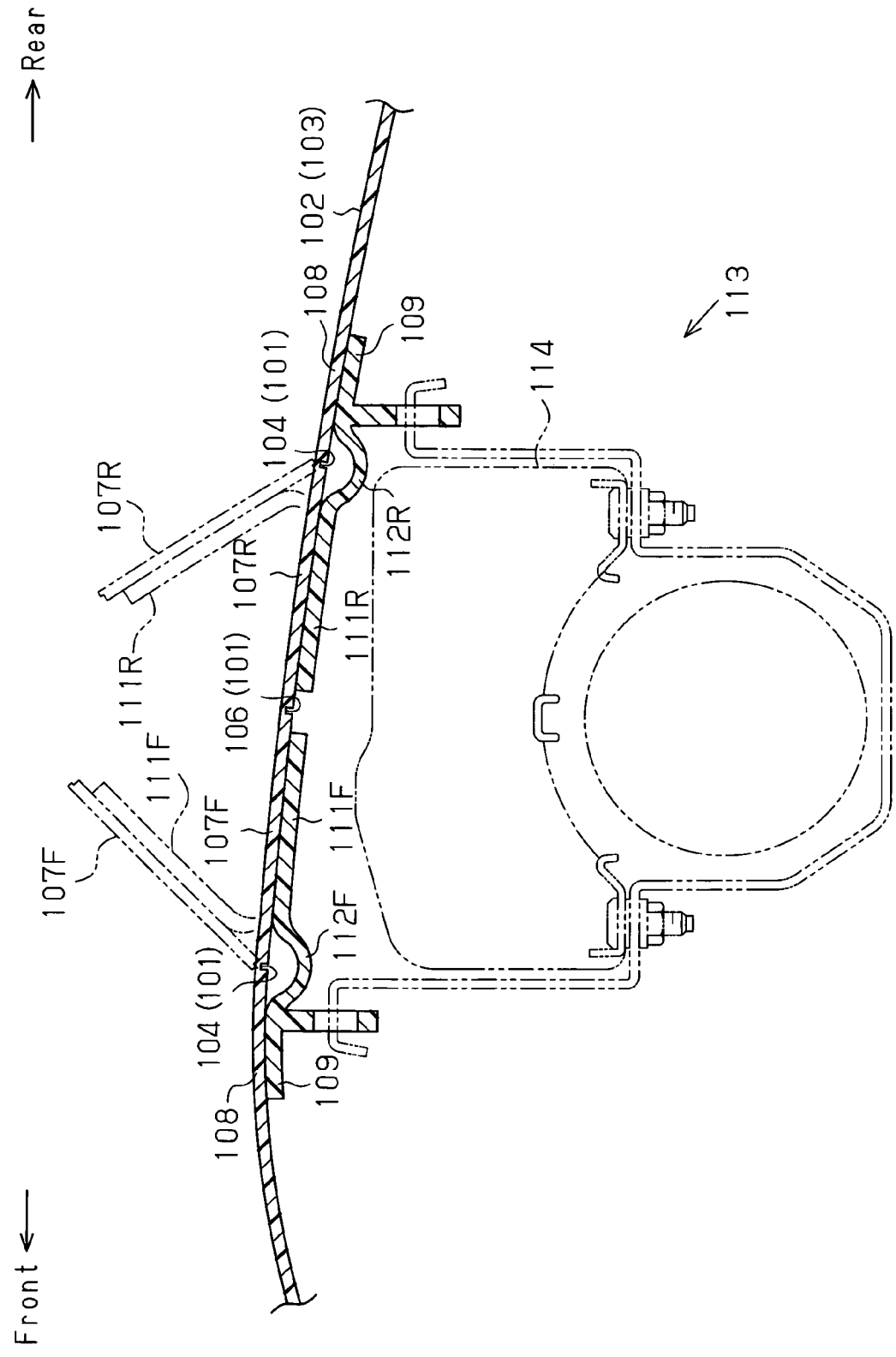

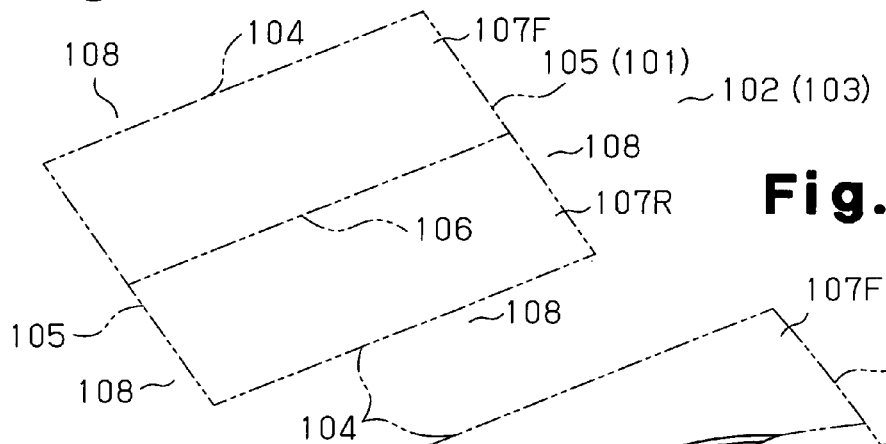
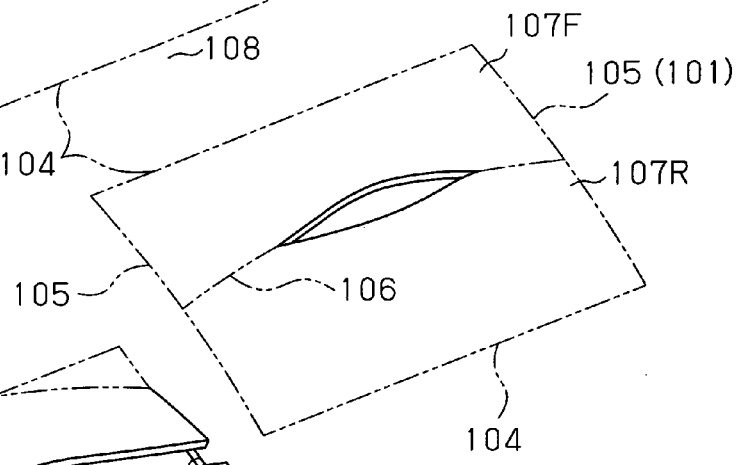
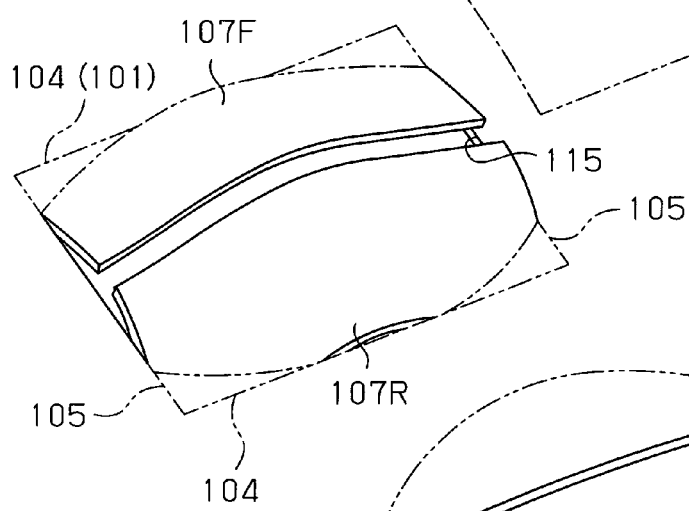
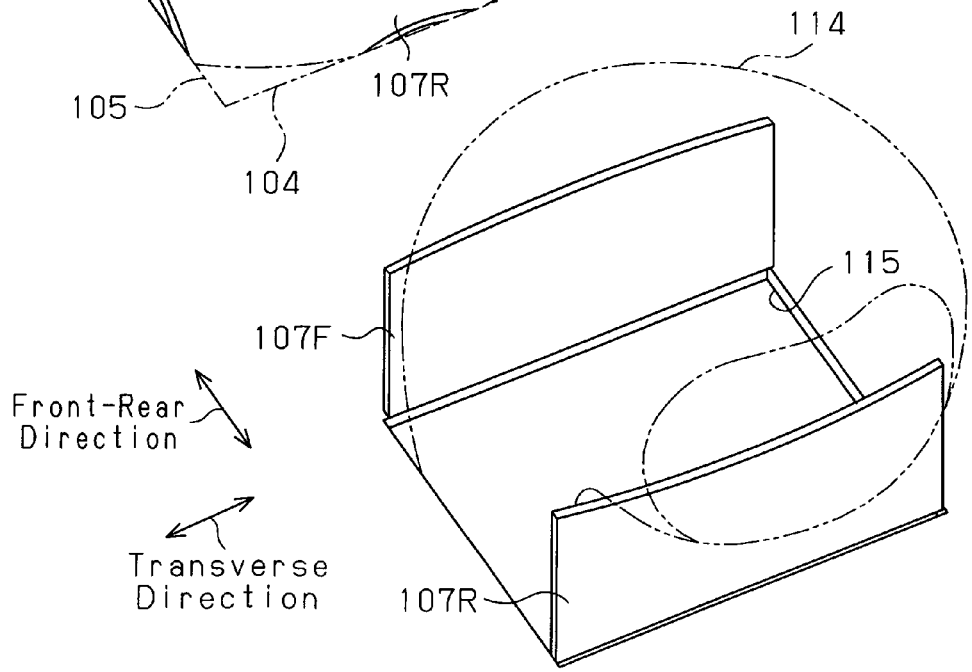

FRONT PASSENGER SEAT AIRBAG APPARATUS

BACKGROUND OF THE INVENTION

The present invention relates to a front passenger seat airbag apparatus that inflates and deploy an airbag in front of a front passenger seat to protect an occupant seated in the seat from an impact when the impact is applied to the vehicle from the front.

Typically, a front passenger seat airbag apparatus is provided in a part of the instrument panel of a vehicle that corresponds to the front passenger seat. In a case where the instrument panel is formed of a hard resin, the following type of front passenger seat airbag apparatus can be employed. That is, an airbag deployment opening is provided in the instrument panel, and the airbag deployment opening is closed by a lid body formed separately from the instrument panel. However, a gap or a step is inevitably formed between the lid body and the instrument panel in this apparatus, which degrades the appearance of the interior of the vehicle. Further, since the lid body, which is formed separately from the instrument panel, needs to be installed, the number of steps for installing the airbag apparatus is increased.

In this respect, front passenger seat airbag apparatuses having a lid body integrally formed with the instrument panel have been proposed (for example, refer to Japanese Laid-Open Patent Publication No. 2008-37282). FIG. 19 shows a cross-sectional structure of an airbag apparatus of this type, and FIGS. 20(A) to 20(D) show a process in which the airbag is inflated and deployed. As shown in FIGS. 19 and 20, a base member 103 of an instrument panel 102 has an split-opening portion 101 on a back surface (lower surface as viewed in FIG. 19). The split-opening portion 101 can be opened and broken when the airbag is inflated and deployed. The split-opening portion 101 is formed by two transverse breakable portions 104, two front-rear breakable portions 105, and a middle breakable portion 106.

The transverse breakable portions 104 are arranged along the front-rear direction of the vehicle and extend substantially along the transverse direction of the vehicle (in a direction perpendicular to the elevation of FIG. 19). The two front-rear breakable portions 105 are arranged along the transverse direction of the vehicle, and extend substantially along the front-rear direction of the vehicle. The two transverse breakable portions 104 and the two front-rear breakable portions 105 are connected to each other to substantially form a rectangle. The middle breakable portion 106 is located between the two transverse breakable portions 104 and extends along the transverse direction of the vehicle to be connected to the front-rear breakable portions 105. The middle breakable portion 106 thus divides the rectangle formed by the breakable portions 104, 105 into two front and rear rectangles.

Two portions of the base member 103 that are surrounded by the transverse breakable portions 104 and the front-rear breakable portions 105 and divided into front and rear parts by the middle breakable portion 106 are referred to as door portions 107F, 107R. A portion of the split-opening portion 101 that is close to the outer side (a portion about the split-opening portion 101) is referred to as a door adjacent portion 108. The door adjacent portion 108 is supported by a frame portion 109 provided on its back surface. The door portions 107F, 107R are supported from the back by a pair of door support portions 111F, 111R, which are arranged along the front-rear direction in the frame portion 109. The door support portions 111F, 111R are coupled to the frame portion 109 by a pair of front and rear hinge portions 112F, 112R.

In the front passenger seat airbag apparatus 113 configured as described above, when an impact is applied to the vehicle from the front, for example, due to a frontal collision, inflation gas is supplied to an airbag 114, which is in turn inflated while being unfolded. With the inflation, the pressing force of the airbag 114 acts on the front and rear door portions 107F, 107R through the front and rear door support portions 111F, 111R. The pressing force breaks the breakable portions, thereby separating the front and rear door portions 107F, 107R from the door adjacent portion 108. The front and rear door support portions 111F, 111R are pivoted upward about the hinge portions 112F, 112R, together with the door portions 107F, 107R, and are opened forward and rearward, respectively. This creates an airbag deployment opening 115 for the airbag 114 in the instrument panel 102 (see FIG. 20(D)).

However, in the front passenger seat airbag apparatus 113, in which the instrument panel and the lid body are integrally formed, the breaking strength of the breakable portions 104, 105, 106 is substantially the same in a normal condition. On the other hand, when the airbag 114, which has been folded by a common folding method, is inflated while being unfolded, pressing force generated by the inflation of the airbag 114 applied to the middle breakable portion 106 is greatest in the base member 103. Thus, in the split-opening portion 101, the middle breakable portion 106 is first broken (see FIG. 20(B)). Then, the front-rear breakable portion 105 and the transverse breakable portion 104 are broken (see FIGS. 20(C), 20(D)). When the split-opening portion 101 is broken in this manner, the door support portions 111F, 111R start pivoting about the hinge portions 112F, 112R after the middle breakable portion 106 is broken and before the transverse breakable portions 104 are broken. Accordingly, the door support portions 111F, 111R and the door portions 107F, 107R are pivoted in small radii while the transverse breakable portions 104 is being broken. As a result, the door portions 107F, 107R interfere with the door adjacent portion 108 in the vicinity of each transverse breakable portion 104. This can cause the door portions 107F, 107R or the door adjacent portion 108 to crack or shatter.

Under low-temperature environment, for example, during wintertime, the brittleness of the base member 103 is increased and the above described phenomenon is more likely to occur. Since the hinge portions 112F, 112R shrink and are hardened under low-temperature environment, the radii of rotation of the door portions 107F, 107R are not expected to be increased. This also can promote the cracking and shattering.

During recent years, the weight of vehicle parts have been reduced to improve the fuel economy of vehicles. As part of the attempts to reduce the weight of the parts, the thickness of resin parts have been reduced, and the base members of instrument panels tend to be formed thinner. However, in the above described front passenger seat airbag apparatus 113, if the door portions 107F, 107R and the door adjacent portion 108 are formed to be thin, the strength of these parts are reduced, which is more likely cause the cracking and shattering.

Therefore, there is a demand for a front passenger seat airbag apparatus having a thin base member that is not easily cracked or shattered under low temperature environment.

FIG. 1 of the above cited document shows a state of the connected door portions 107F, 107R being separated from the door adjacent portion 108 by alternate long and two short dashes lines. However, the description of the documents has no explanation about this phenomenon. Also, no explanation is given as to the order in which the breakable portions are broken.

Even if FIG. 1 of the document was drafted with the intension of showing that the transverse breakable portions 104 are to be broken before the middle breakable portion 106 is broken, the specific time at which the front-rear breakable portions 105 should be broken is not clearly disclosed. The manner in which the breakable portions are broken is determined based on the manner in which the airbag 114 is unfolded and on the characteristics of the hinge portions 112F, 112R. In the apparatus of the above cited document, the cracking and shattering as described above can still be caused depending on the manner in which the breakable portions are broken.

SUMMARY OF THE INVENTION

Accordingly, it is an objective of the present invention to provide a front passenger seat airbag apparatus that reliably prevents the base member of an instrument panel from being cracked or shattered when door portions are opened.

To achieve the foregoing objective and in accordance with one aspect of the present invention, a front passenger seat airbag apparatus having a split-opening portion, a pair of door portions, a door adjacent portion, a frame portion, and a pair of door support portions is provided. The split-opening portion is formed in a portion of the base member of a vehicle instrument panel that corresponds to a front passenger seat. The split opening portion are formed by two transverse breakable portions that are arranged along the front-rear direction of the vehicle and extend substantially along the transverse direction of the vehicle, two front-rear breakable portions that are arranged along the transverse direction of the vehicle and extend substantially along the front-rear direction of the vehicle, and a middle breakable portion that is located between the two transverse breakable portions and extends substantially along the transverse direction of the vehicle. The two transverse breakable portions and the two front-rear breakable portions are connected to each other to form a closed shape, and the middle breakable portion is connected to the front-rear breakable portions, so as to divides the closed shape. The door portions are formed by two portions of the base member that are surrounded by the transverse breakable portions and the front-rear breakable portions. The two portions are divided into front and rear parts by the middle breakable portion. The door adjacent portion is formed by a part of the base member that is outside of and adjacent to the split-opening portion. The frame portion supports the door adjacent portion. The door support portions are arranged along the front-rear direction in the frame portion, and are coupled to the frame portion with a pair of hinge portions. Each door support portion supports one of the door portions. The door portions allow the split-opening portion to be broken by pressing force of an inflated airbag so that split-opening portion is separated from the door adjacent portion. The door support portions are pivoted together with the door portions about the hinge portions serving as fulcrums. The split-opening portion is broken in the order of the transverse breakable portions, the front-rear breakable portions, and the middle breakable portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9 is a diagram corresponding to FIG. 3, showing a state of the front passenger seat airbag while the split-opening portion is being broken;

FIG. 12 is an enlarged cross-sectional view corresponding to a FIG. 3, illustrating a front passenger seat airbag apparatus according to a third embodiment of the present invention;

FIG. 19 is a cross-sectional view illustrating a prior art front passenger seat airbag apparatus; and FIGS. 20(A) to 20(D) are diagrammatic perspective views illustrating the manner in which breakable portions are sequentially broken when the airbag of a prior art front passenger airbag apparatus is inflated.

DETAILED DESCRIPTION OF THE PREFERRED EMBODIMENTS

First Embodiment

A first embodiment of the present invention will now be described with reference to FIGS. 1 to 10.

Figure 1:
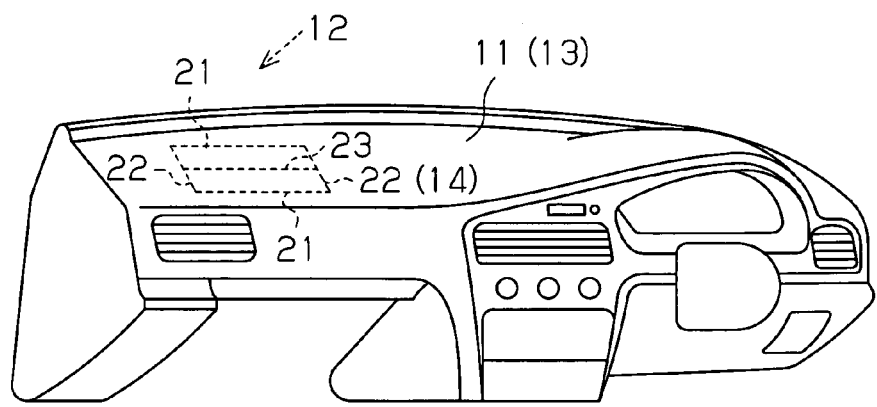
FIG. 1 is a perspective view showing an instrument panel, in which a front passenger seat airbag apparatus according to a first embodiment of the present invention is mounted.
Figure 2:
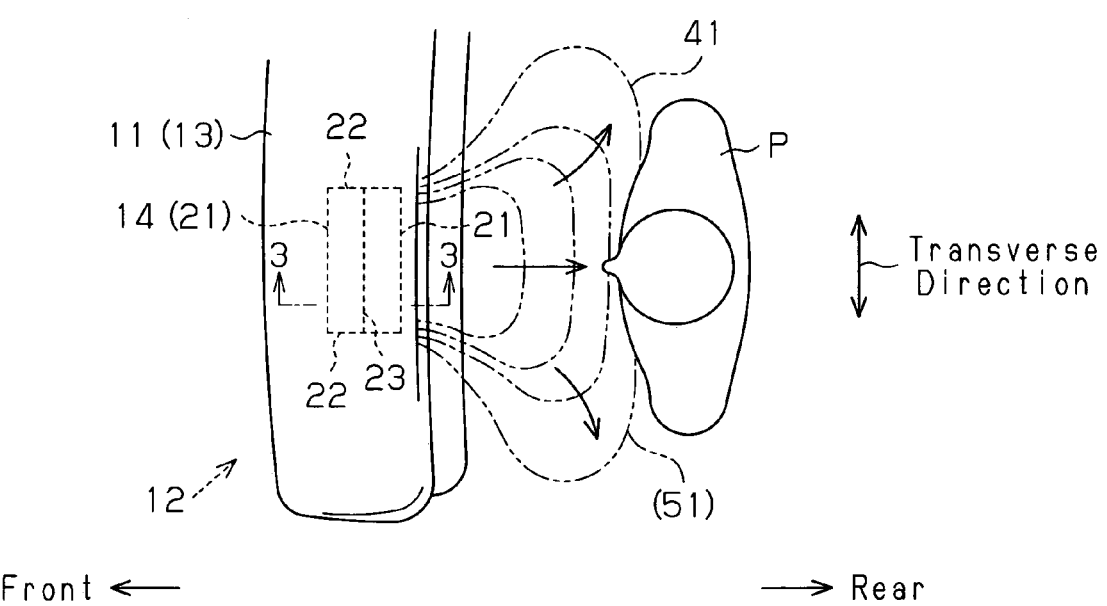
FIG. 2 is a partial plan view illustrating the relationship between a part of the instrument that corresponds to the front passenger seat and an occupant seated in the front passenger seat.
Figure 3:
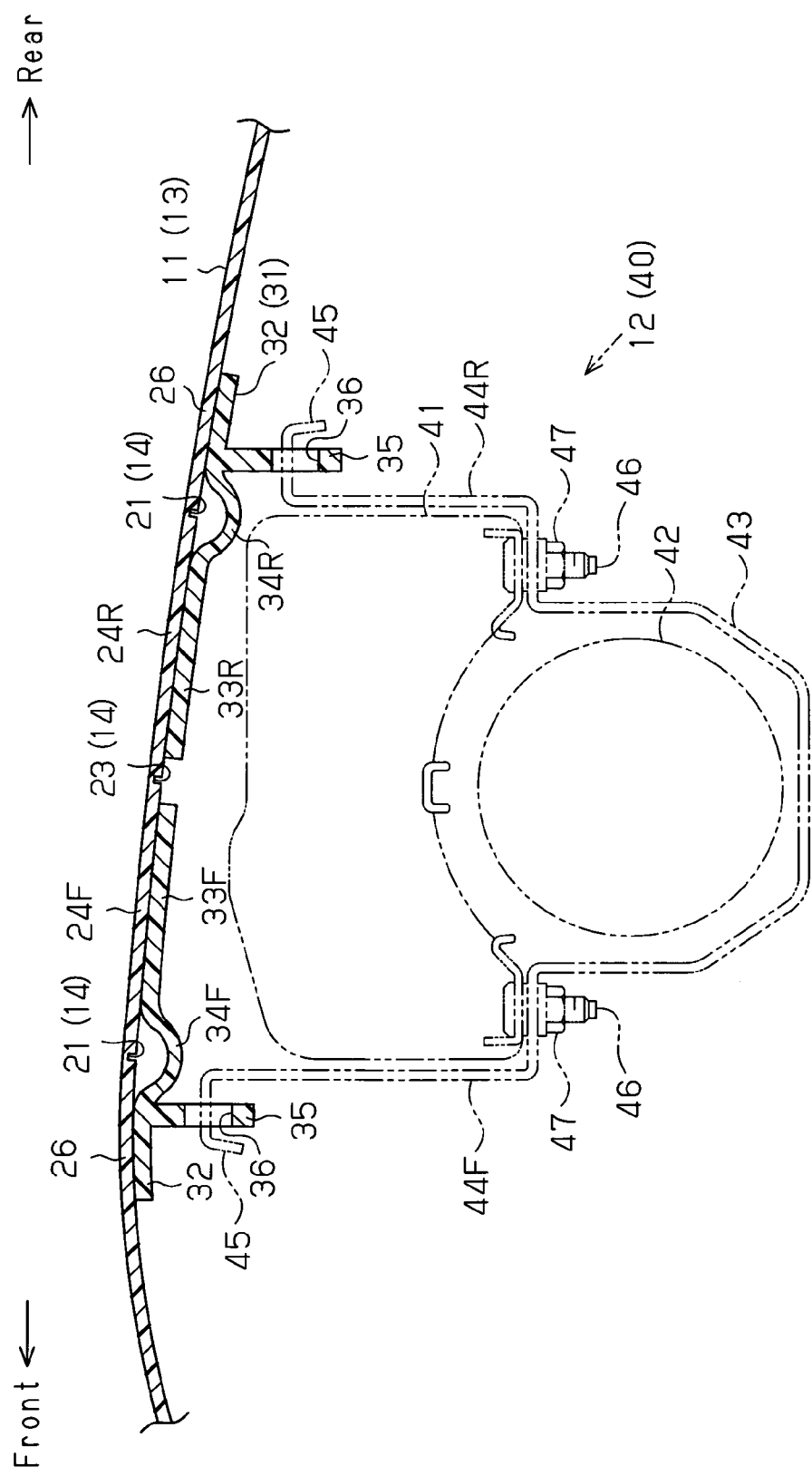
FIG. 3 is an enlarged cross-sectional view taken along line 3-3 of FIG. 2, showing the front passenger seat airbag apparatus.

FIG. 1 is a perspective view showing an instrument panel, in which a front passenger seat airbag apparatus according to the present embodiment of the present invention is mounted. FIG. 2 is a plan view illustrating the relationship between a part of the instrument that corresponds to the front passenger seat and an occupant seated in the front passenger seat. FIG. 3 is an enlarged cross-sectional view taken along line 3-3 of FIG. 2, showing the front passenger seat airbag apparatus.

In a vehicle, an instrument panel 11 made of synthetic resin is arranged in front of the driver's seat and the front passenger seat as shown in FIGS. 1 and 2. A front passenger seat airbag apparatus 12 is mounted in a part of the instrument panel 11 that corresponds to the front passenger seat. The front passenger seat airbag apparatus 12 uses part of the instrument panel 11 as its own component.

The instrument panel 11 is formed mainly by a single layer base member 13. The base member 13 is formed by injection molding using a hard synthetic resin material such as polypropylene (PP). The base member 13 has a complex shape with projections and recesses, and three dimensional curves. Devices such as an instrument panel, an air conditioner control panel, and car audio equipment. In the base member 13, at least a part that forms a portion of the front passenger seat airbag apparatus 12 is formed to be thinner than conventional base members. That is, while the corresponding part of a conventional type has a thickness of 3.0 to 3.5 mm, the part of the present embodiment has approximately the half thickness, or approximately 1.5 mm.

Figure 4:
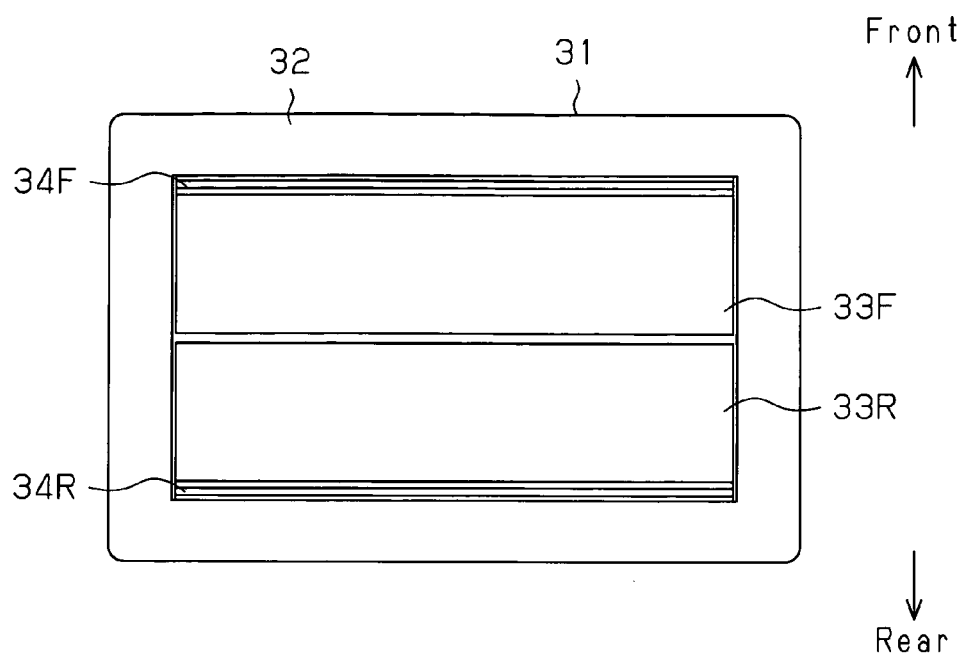
FIG. 4 is a front view illustrating an airbag cover of the front passenger seat airbag apparatus, as viewed from the front passenger seat.
Figure 5:
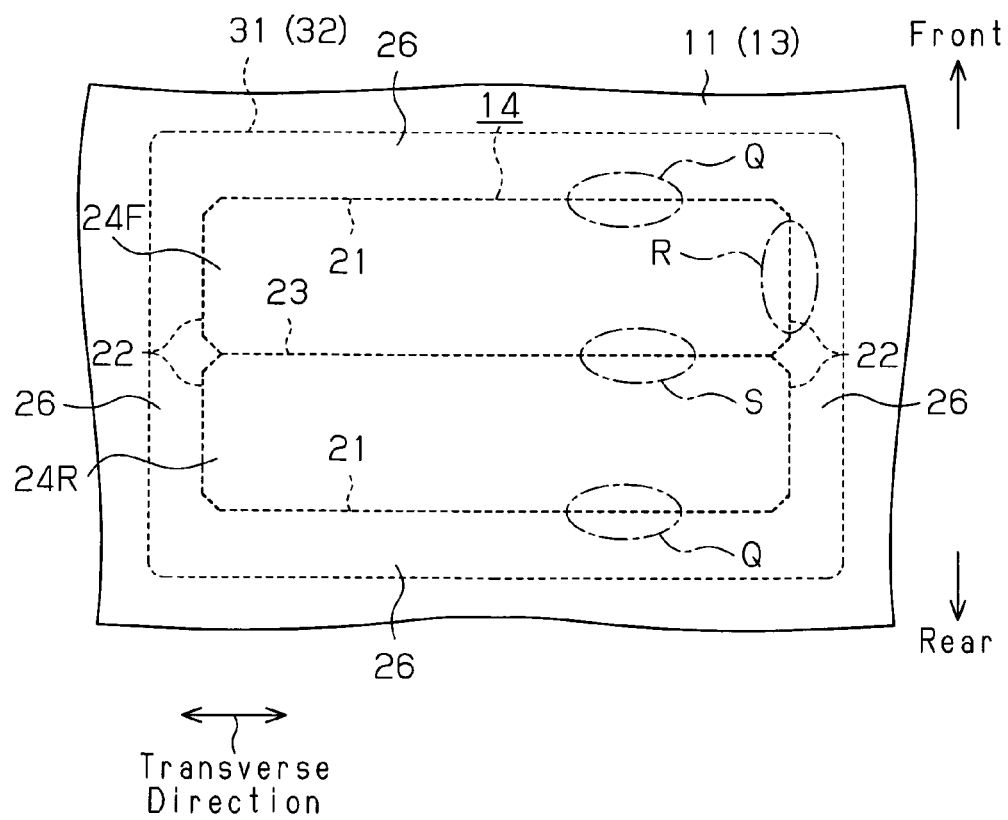
FIG. 5 is a partial front view illustrating door portions, a door adjacent portion, and an split-opening portion of the front passenger seat airbag apparatus, as viewed from the front passenger seat.
Figure 6A:
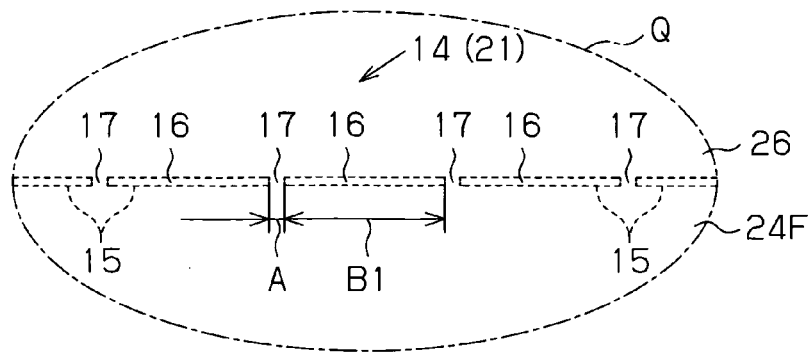
FIG. 6(A) is an enlarged front cross-sectional view illustrating front section Q in FIG. 5.
Figure 6B:
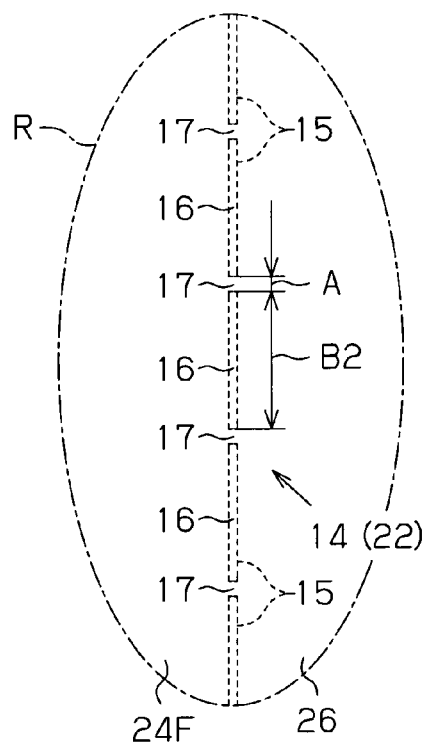
FIG. 6(B) is an enlarged front cross-sectional view illustrating section R in FIG. 5.
Figure 6C:
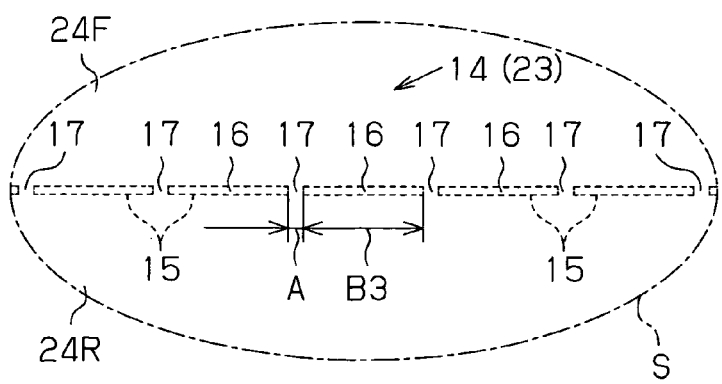
FIG. 6(C) is an enlarged front cross-sectional view illustrating section S in FIG. 5.

As indicated in FIGS. 1 to 3, the surface of the base member 13 that faces the front passenger seat is referred to as a front face, and the opposite surface is referred to as a back face. A split-opening portion (tear line) 14 is formed in the back face of the base member 13. The split-opening portion 14 is formed when the base member 13 is molded. FIG. 4 shows an airbag cover 31 of the front passenger seat airbag apparatus 12, as viewed from the front passenger seat. FIG. 5 shows the split-opening portion 14 as viewed from the front passenger seat, and FIGS. 6(A) to 6(C) show front one of two sections Q, section R, section S, which are shown by alternate long and short dash lines. Despite the small differences, the structure of sections Q shown in FIG. 5 have a lot in common with door portions 24F, 24R and a door adjacent portion 26, which will be discussed below. Therefore, in the description, only the front one of sections Q is explained, and the explanation of rear section Q is omitted.

As shown in FIGS. 6(A) to 6(C), the split-opening portion 14 is formed by alternately arranging thin portions 16 and thick portions 17. Each thin portion 16 has a groove-like recess 15 so as to be thin, while the thick portions 17 have no recesses 15. Accordingly, the thin portions 16 have a lower breaking strength than the thick portions 17. Leaving intermittent sections without recesses 15 (the thick portions 17) prevents the hardness of the split-opening portion 14 from being excessively low, as compared to a case where the recess 15 is formed by a single continuous groove. Therefore, the split-opening portion 14 is not easily deformed by external factors. For example, even if the occupant P put a hand on the instrument panel 11 and weights on it, the pressing force does not easily deform the split-opening portion 14. Since the recesses 15 is formed in the back face of the base member 13, the recesses 15 are not visible on the front face of the base member 13. Thus, the recesses 15 do not degrade the appearance.

As shown in FIG. 5, the split-opening portion 14 is formed by two transverse breakable portions 21, two front-rear breakable portions 22, and a middle breakable portion 23. The two transverse breakable portions 21 are arranged along the front-rear direction of the vehicle, and extend substantially along the transverse direction of the vehicle. The two front-rear breakable portions 22 are arranged along the transverse direction of the vehicle, and extend substantially along the front-rear direction of the vehicle. The two transverse breakable portions 21 and the two front-rear breakable portions 22 are connected to each other to substantially form a rectangle. The middle breakable portion 23 is located between the two transverse breakable portions 21, and extends along the transverse direction of the vehicle to be connected to the front-rear breakable portions 22. The middle breakable portion 23 divides the substantial rectangle formed by the breakable portions 21, 22 into two front and rear substantial rectangles.

Two portions of the base member 13 that are surrounded by the transverse breakable portions 21 and the front-rear breakable portions 22 and divided into front and rear parts by the middle breakable portion 23 are referred to as door portions 24F, 24R. A portion of the split-opening portion 14 that is close to the outer side (a portion about the split-opening portion 14) is referred to as a door adjacent portion 26. Since the split-opening portion 14 is not formed in the front face of the base member 13, the boundary between the door portions 24F, 24R and the door adjacent portion 26 is not visible to the occupant.

As shown in FIGS. 3 to 5, the airbag cover 31 is arranged on the back face of the front and rear door portions 24F, 24R and the door adjacent portion 26. The airbag cover 31 is formed of a soft synthetic resin such as olefinic thermoplastic elastomer (TPO), and includes a rectangular frame portion 32, which corresponds to the door adjacent portion 26, a pair of front and rear door support portions 33F, 33R, and a pair of front and rear curved hinge portions 34F, 34r. Since the airbag cover 31 is formed of a soft resin, smooth hinging motion of the hinge portions 34F, 34R is permitted, and the airbag 41 is prevented from being damaged.

The frame portion 32 is joined to the back face of the door adjacent portion 26, for example, by vibration welding, so as to reinforce the door adjacent portion 26 from the back face. The door support portions 33F, 33R are formed like rectangular plates, and are arranged along the front-rear direction in the frame portion 32. The front door support portion 33F is coupled to the frame portion 32 by the front hinge portion 34F, and integrally formed with the hinge portion 34F and the frame portion 32. The rear door support portion 33R is coupled to the frame portion 32 by the rear hinge portion 34R, and integrally formed with the hinge portion 34R and the frame portion 32. That is, the door support portions 33F, 33R are connected to the frame portion 32 only by the front and rear hinge portions 34F, 34R.

As shown in FIG. 4, the rear side of the door support portion 33F and the front side of the door support portion 33R are slightly separated, and the left and right sides of the door support portions 33F, 33R are slightly separated from the frame portion 32. Therefore, the door support portions 33F, 33R open in opposite directions (forward and rearward) at the hinge portions 34F, 34R. That is, the door support portions 33F, 33R have a double-leaf-door structure.

The hinge portions 34F, 34R are located in the vicinity and below the transverse breakable portions 21. The door support portions 33F, 33R are joined to the back face of the door portions 24F, 24R, for example, by vibration welding, respectively, so as to reinforce the door portions 24F, 24r from the back face.

As shown in FIG. 3, an attachment wall 35 is provided on the back face of the frame portion 32. The attachment wall 35 projects downward from the inner edge of the frame portion 32. An airbag module 40 is attached to the attachment wall 35. The airbag module 40 includes an airbag 41, an inflator 42 for supplying inflation gas to the airbag 41, and a case 43 for accommodating and retaining the airbag 41 and the inflator 42.

The airbag 41 is formed of a base fabric sheet in a bag shape. The fabric is preferably formed of a material having high strength and flexibility so as to be easily folded. The material may be, for example, woven cloth formed of polyester threads or polyamide threads. The airbag 41 has a size (refer to the alternate long and two short dashes lines in FIG. 2) that can be inflated and deployed in a space between the instrument panel 11 and the occupant P in the front passenger seat. The airbag 41 is folded into a compact form, and arranged below and in the vicinity of the door support portions 33F, 33R. The airbag 41 is fastened at its bottom to the case 43 by bolts 46 and nuts 47. A gas inlet (not shown) is formed at the bottom of the airbag 41 to guide inflation gas from the inflator 42 into the airbag 41.

The inflator 42 of the present embodiment is a cylinder type. The inflator 42 is fixed to the case 43 and located below the gas inlet of the airbag 41. The inflator 42 accommodates in it gas generating agent (not shown), and generates gas by combustion reaction of the gas generating agent. In place of the type using the gas generating agent as shown above, it is possible to use a type of inflator that breaks a partition wall of a high-pressure gas cylinder filled with a high-pressure gas by a low explosive so as to jet out the gas.

A hook-shaped claw portion 45 is formed at the upper end of each of a front wall 44F and a rear wall 44R of the case 43. On the other hand, an engaging hole 36 is formed in each of the front and rear attachment walls 35. The claw portions 45 of the case 43 are engaged with the engaging holes 36 of the attachment walls 35.

A reinforcement (not shown) of the vehicle body is provided in the vicinity of a position below the case 43 in the vehicle body. The case 43 is fixed to the reinforcement with other components such as brackets (not shown) attached to the case 43.

In this manner, the attachment walls 35 are engaged with the case 43 fixed to the reinforcement. That is, the claw portions 45 are engaged with the engaging holes 36. This prevents the frame portion 32 from being displaced when the airbag 41 is inflated. That is, only the door support portions 33F, 33R are permitted to open and close in the airbag cover 31.

In addition to the above configuration, the apparatus 12 includes means for breaking the split-opening portion 14 in the order of the transverse breakable portions, 21, the front-rear breakable portions 22, and the middle breakable portion 23, when the airbag 41 is inflated. In the first embodiment, this means is achieved by setting the breaking strengths of the split-opening portion 14 to be increased in the order of the transverse breakable portions, 21, the front-rear breakable portions 22, and the middle breakable portion 23. Specifically, if the ratios of the volume of the recesses 15 per unit volume of the transverse breakable portions 21, the front-rear breakable portions 22, and the middle breakable portion 23 are expressed by R1, R2, R3, respectively, the thin portions 16 and the thick portions 17 are formed to satisfy the expression $R1 > R2 > R3$.

More specifically, as shown in FIGS. 6(A) to 6(C), the lengths A of the thick portions 17 in the transverse breakable portions 21, the front-rear breakable portions 22, and the middle breakable portion 23 are equal. The lengths B1, B2, B3 of the recesses 15 (thin portions 16) in the transverse breakable portions 21, the front-rear breakable portions 22, and the middle breakable portion 23 are set to satisfy the expression $B1 > B2 > B3$.

Figure 7A:
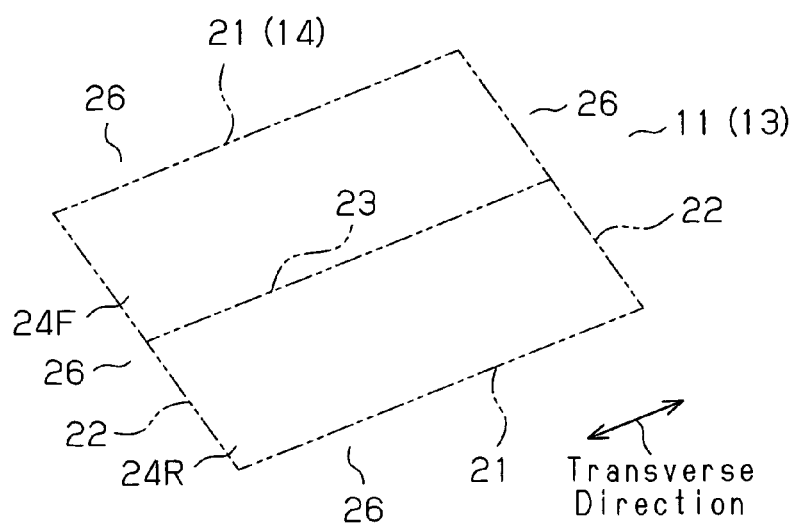
FIGS. 7(A), 7(B), 7(C), 8(A), and 8(B) are diagrammatic perspective views illustrating the manner in which the breakable portions are sequentially broken.

In the front passenger seat airbag apparatus 12 configured as described above, inflation gas is not supplied from the inflator 42 to the airbag 41 so that the airbag 41 is not inflated as shown in FIGS. 3 and 7(A) at normal times, that is, when no impact is applied to the vehicle due to a frontal collision. In the split-opening portion 14, the transverse breakable portions 21 and the front-rear breakable portions 22 are not broken, so that the door portions 24F, 24R are connected to the door adjacent portion 26. The middle breakable portion 23 is not broken either, and the door portions 24F, 24R are connected to each other. Therefore, a part of the base member 13 of the instrument panel 11 that functions as an airbag deployment opening 18 for the airbag 41 (refer to FIGS. 7(B) and 7(C)) is closed.

When an impact is applied to the vehicle from the front due to a frontal collision, the inflator 42 supplies inflation gas to the airbag 41, so that the airbag 41 is inflated while being unfolded. With the inflation, the pressing force of the airbag 41 acts on the door portions 24F, 24R through the door support portions 33F, 33R, and the door support portions 33F, 33R act to deform to bulge in convex shapes. At this time, since the door adjacent portion 26, which is joined to and reinforced by the frame portion 32, has a high rigidity, the door adjacent portion 26 is hardly deformed, so that the pressing force of the airbag 41 concentrates on the split-opening portion 14.

In the first embodiment, since the recesses 15 are formed in the thin portions 16, the thin portions 16 are thin and have a lower breaking strength than the thick portions 17. The longer the recess 15, the greater the ratio of the volume of the recess 15 per unit volume of the breakable portion becomes. The breaking strength of the breakable portion is reduced, accordingly. In the present embodiment, the thin portions 16 and the thick portions 17 are formed such that, when the pressing force of the airbag 41 acts on the split-opening portion 14, parts of the split-opening portion 14 become progressively harder to break in the order of the transverse breakable portions 21, the front-rear breakable portions 22, and the middle breakable portion 23.

More specifically, as described above, the lengths A of the thick portions 17 in the transverse breakable portions 21, the front-rear breakable portions 22, and the middle breakable portion 23 are the same. Therefore, the greater the lengths B1, B2, B3 of the recesses 15 of the transverse breakable portions 21, the front-rear breakable portion 22, and the middle breakable portions 23, the greater the ratios R1, R2, R3 of the volume of the recesses 15 per unit volume of the breakable portions become.

Since the lengths B1, B2, B3 satisfy the expression B1>B2>B3 as described above, the ratios R1, R2, R3 the volume occupied by the recesses 15 in the breakable portions satisfy the expression R1>R2>R3. The breaking strength of the split-opening portion 14 increases in the order of the transverse breakable portions 21, the front-rear breakable portions 22, and the middle breakable portion 23. The split-opening portion 14 becomes less easily broken in the order of the transverse breakable portions 21, the front-rear breakable portions 22, and the middle breakable portion 23.

Figure 7B:
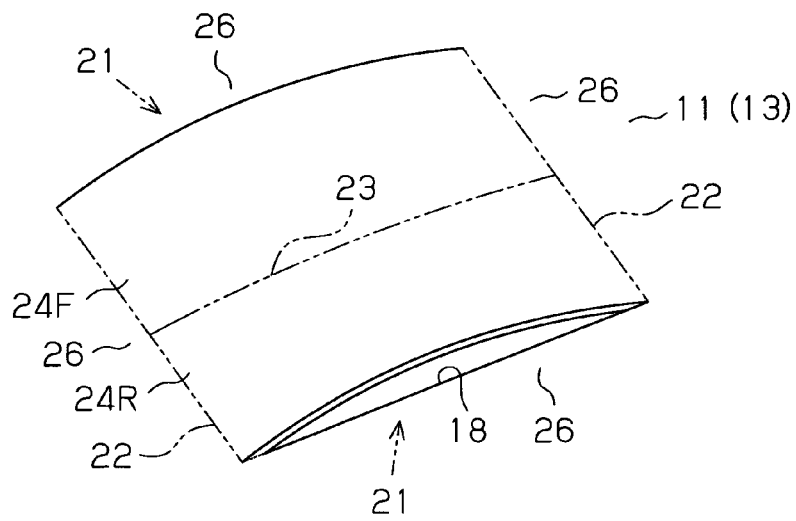
Figure 7C:
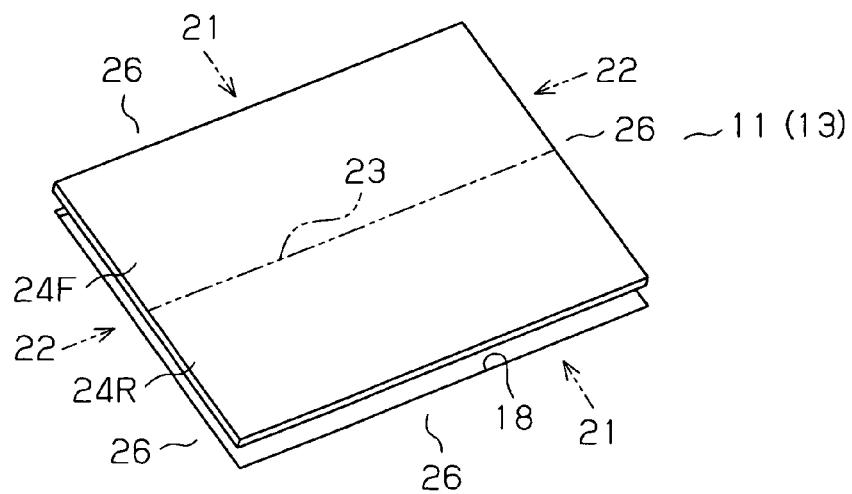

Thus, the pressing force accompanying the inflation of the airbag 41 breaks the split-opening portion 14 first at the transverse breakable portions 21 as shown in FIG. 7(B). The door portions 24F, 24R are separated from the door adjacent portion 26 at the transverse breakable portions 21. Therefore, in the vicinity of the broken transverse breakable portions 21, the pressing force of the airbag 41 separates the door portions 24F, 24R from the door adjacent portion 26.

After the transverse breakable portions 21 are broken, the front-rear breakable portions 22 are broken in the split-opening portion 14. This breakage causes the door portions 24F, 24R to be separated from the door adjacent portion 26 at the front-rear breakable portions 22 as shown by solid lines in FIGS. 7(C) and 9, in addition to at the transverse breakable portions 21. In other ward, the door portions 24F, 24R are completely separated from the door adjacent portion 26. At this point, however, the middle breakable portion 23 has not been broken, and the door portions 24F, 24R are still connected to each other. That is, the door portions 24F, 24R are elevated from the door adjacent portion 26 while being connected to each other. Accordingly, the distance between the door portions 24F, 24R and the door adjacent portion 26 is increased.

Figure 8A:
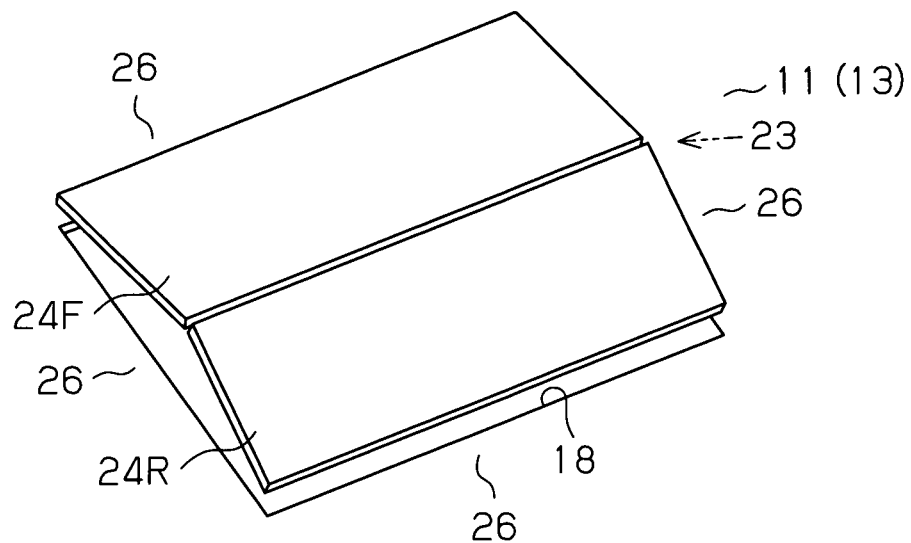
Figure 8B:
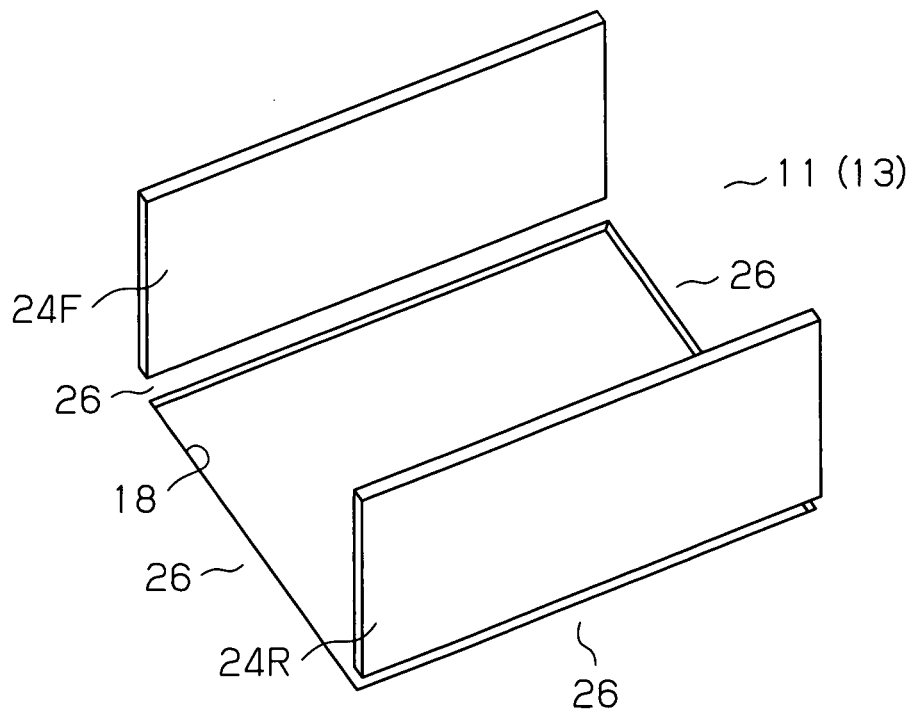
Figure 10:
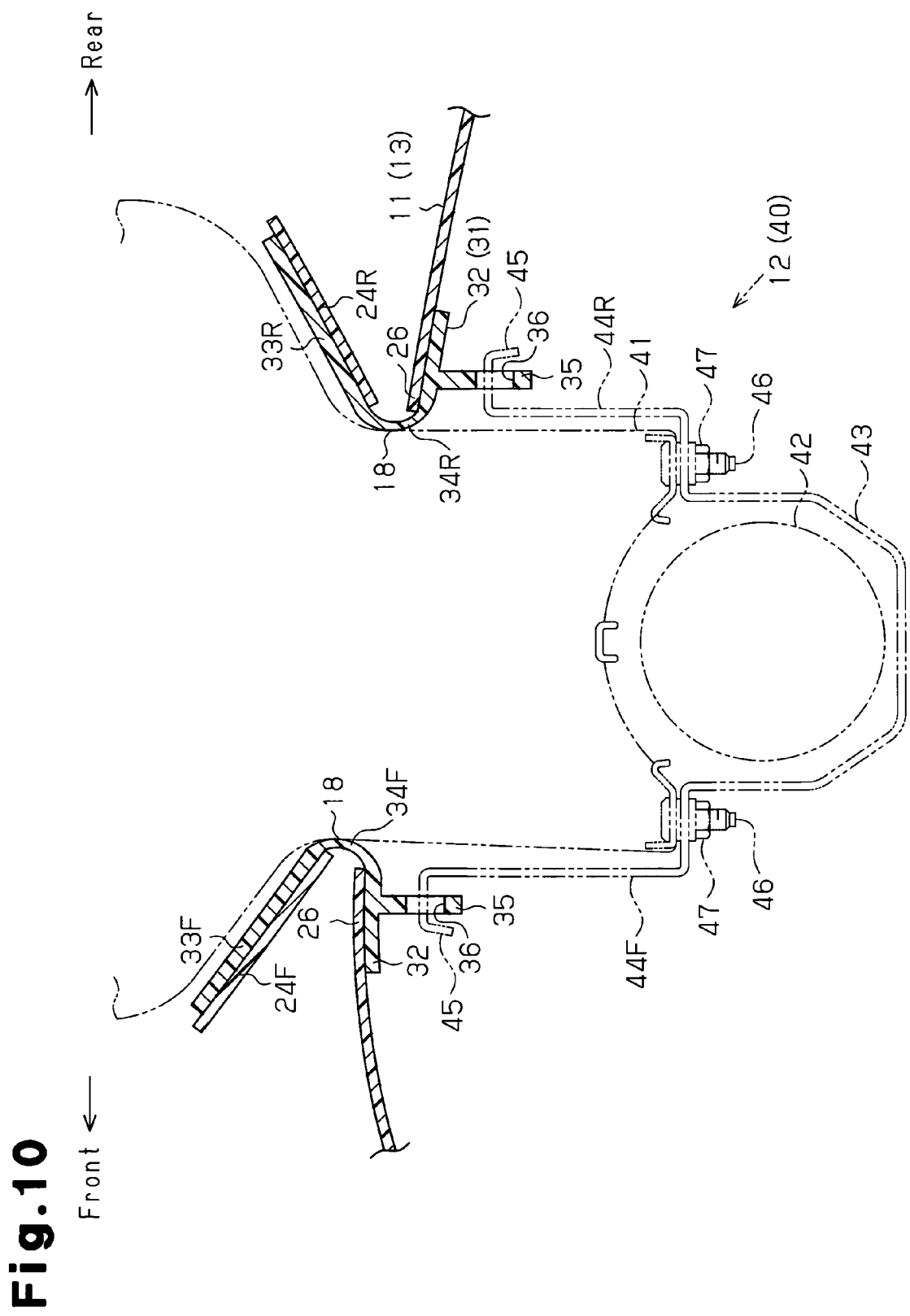
FIG. 10 is a diagram corresponding to FIG. 3, showing a state in which the breakable portions are broken and the door portions are open.

After the front-rear breakable portions 22 are broken, the middle breakable portion 23 is lastly broken in the split-opening portion 14 as shown by alternate long and two short dashes lines in FIGS. 8(A) and 9. This separates the door portions 24F, 24R from each other. The door support portion 33F, which supports the front door portion 24F, is pivoted forward together with the door portion 24F about the front hinge portion 34F serving as a fulcrum, and the door support portion 33R, which supports the rear door portion 24R, is pivoted rearward together with the door portion 24R about the rear hinge portion 34R as a fulcrum. At this time, the transverse breakable portions 21 and the front-rear breakable portions 22 have already been broken, and the door support portions 33F, 33R separated upward form the door adjacent portion 26. Therefore, the door support portions 33F, 33R and the door portions 24F, 24R pivot on a large diameter as shown in FIG. 10. As a result, the door portions 24F, 24R hardly contact the door adjacent portion 26 in the vicinity of the transverse breakable portion 21.

When the door support portions 33F, 33R are pivoted together with the door portions 24F, 24R about the hinge portions 34F, 34R serving as fulcrums, the door portions 24F, 24R are opened forward and rearward, creating the airbag deployment opening 18 for the airbag 41 in the instrument panel 11. The airbag 41 passes through the airbag deployment opening 18 and is inflated between the instrument panel 11 and the occupant P in the front passenger seat (see FIG. 2), thereby reducing the impact applied to the occupant P due to the frontal collision.

The first embodiment as described above has the following advantages.

(1) The pressing force of the airbag 41 being inflated breaks the split-opening portion 14 in the order of the transverse breakable portions 21, the front-rear breakable portions 22, and the middle breakable portion 23. Therefore, the door portions 24F, 24R are prevented from being cracked or shattered due to contact with the door adjacent portion 26 when pivoting not only at normal temperature, but also under low temperature environment, in which the base member 13 becomes brittle because of its low-temperature brittleness, the hinge portions 34F, 34R are hardened, or the thickness of the base member 13 is small and its strength is relatively low.

(2) The split-opening portion 14 is formed such that its breaking strength increases in the order of the transverse breakable portions 21, the front-rear breakable portions 22, and the middle breakable portion 23. Thus, regardless of the manner in which the airbag 41 is folded, the split-opening portion 14 is broken in the order of the transverse breakable portion 21, the front-rear breakable portions 22, and the middle breakable portion 23.

(3) The split-opening portion 14 is formed by the thin portions 16 and the thick portions 17, which are alternately provided. The ratios R1 to R3 of the volume of the recesses 15 per unit volume of the transverse breakable portions 21, the front-rear breakable portions 22, and the middle breakable portions 23 are different. In this manner, by differentiating the ratios of the volume of the recesses 15 according to positions in the split-opening portion 14, the split-opening portion 14 is easily made to have different breaking strengths at different breakable portions.

(4) The lengths A of the thick portions 17 in the transverse breakable portions 21, the front-rear breakable portions 22, and the middle breakable portion 23 are the same. The lengths B1 to B3 of the groove-like recesses 15 decrease in the order of the transverse breakable portions 21, the front-rear breakable portions 22, and the middle breakable portion 23. These settings ensure that the breaking strength of the split-opening portion 14 is increased in the order of the transverse breakable portion 21, the front-rear breakable portion 22, and the middle breakable portion 23.

Second Embodiment

Figure 11A:
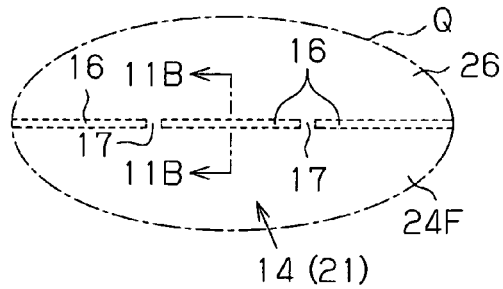
FIG. 11(A) is a partially enlarged front view of an split-opening portion according to a second embodiment of the present invention, showing a part corresponding to front section Q in FIG. 5.
Figure 11B:
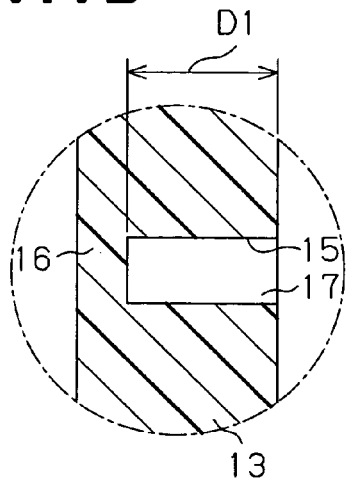
FIG. 11(B) is an enlarged cross-sectional view taken along line 11B-11B of FIG. 11(A)
Figure 11C:
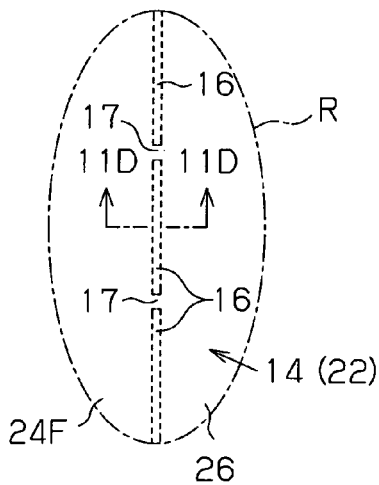
FIG. 11(C) is a partially enlarged front view of an split-opening portion according to a second embodiment of the present invention, showing a part corresponding to front section R in FIG. 5.
Figure 11D:
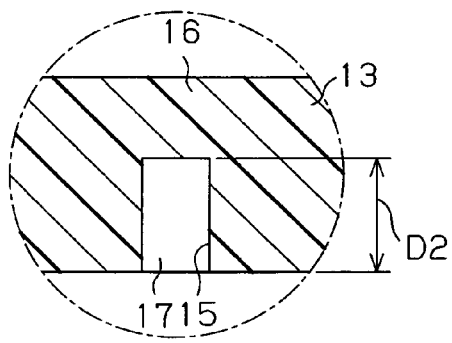
FIG. 11(D) is an enlarged cross-sectional view taken along line 11D-11D of FIG. 11(C)
Figure 11E:
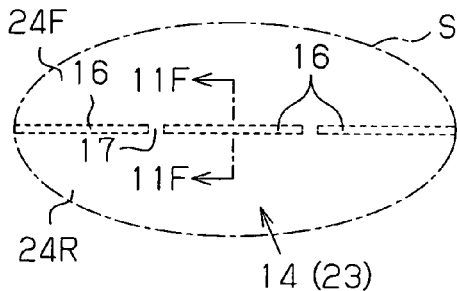
FIG. 11(E) is a partially enlarged front view of an split-opening portion according to a second embodiment of the present invention, showing a part corresponding to front section S in FIG. 5.
Figure 11F:
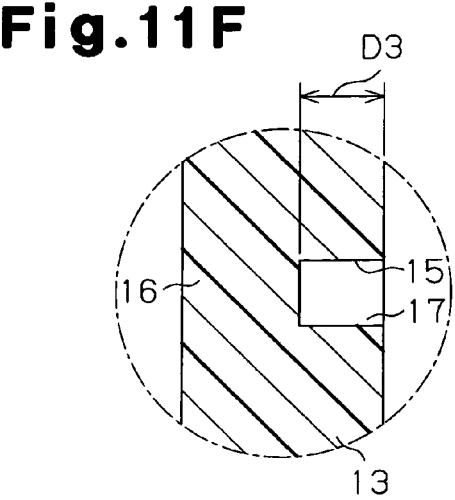
FIG. 11(F) is an enlarged cross-sectional view taken along line 11F-11F of FIG. 11(E)

A second embodiment of the present invention will now be described with reference to FIGS. 11(A) to 11(F). FIGS. 11(A), 11(C), and 11(E) are enlarged views corresponding to front section Q, section R, section S of FIG. 5. FIG. 11(B) is a cross-sectional view taken along line 11B-11B of FIG. 11(A). FIG. 11(D) is a cross-sectional view taken along line 11D-11D of FIG. 11(C). FIG. 11(F) is a cross-sectional view taken along line 11F-11F of FIG. 11(E).

In the second embodiment also, as described above, the lengths A of the thick portions 17 in the transverse breakable portions 21, the front-rear breakable portions 22, and the middle breakable portion 23 are the same. On the other hand, unlike the first embodiment, the lengths B1, B2, and B3 of the recesses 15 in the transverse breakable portions 21, the front-rear breakable portions 22, and the middle breakable portion 23 are the same.

The depths D1, D2, D3 of the recesses 15 in the transverse breakable portions 21, the front-rear breakable portions 22, and the middle breakable portion 23 are set to satisfy the expression D1>D2>D3. In other words, the thicknesses of the thin portions 16 increase in the order of the transverse breakable portions 21, the front-rear breakable portions 22, and the middle breakable portion 23. Other than these differences, the second embodiment is the same as the first embodiment.

The deeper the recess 15, the greater the ratio of the volume of the recess 15 per unit volume of the breakable portion becomes. The breaking strength of the breakable portion is reduced, accordingly. Thus, by differentiating the depths D1 to D3 of the recesses 15, the ratios R1, R2, R3 of the volume of the recesses 15 decrease in the order of the transverse breakable portions 21, the front-rear breakable portions 22, and the middle breakable portion 23. Therefore, by setting the depths D1 to D3 of the recesses 15 in the breakable portions to satisfy the expression D1>D2>D3, the breaking strength of the split-opening portion 14 is increased in the order of the transverse breakable portions 21, the front-rear breakable portions 22, and the middle breakable portion 23.

Thus, according to the second embodiment, the depths D1 to D3 of the recesses 15 in the breakable portions are set to be progressively decreased so that the same advantages as the advantages (1) to (4) of the first embodiment are achieved.

Third Embodiment

A third embodiment of the present invention will now be described with reference to FIGS. 12 to 18.

In addition to the configuration of the first embodiment, the airbag 41 of the third embodiment is folded in a manner that satisfies the following conditions and accommodated in the case 43, as shown in FIG. 12. That is, when the airbag 41 is inflated and unfolded, the pressing force applied by the airbag 41 is decreased in the order of the transverse breakable portions 21, the front-rear breakable portions 22, and the middle breakable portion 23. This allows the split-opening portion 14 to be sequentially broken in the order of the transverse breakable portions 21, the front-rear breakable portions 22, and the middle breakable portion 23.

Figure 13:
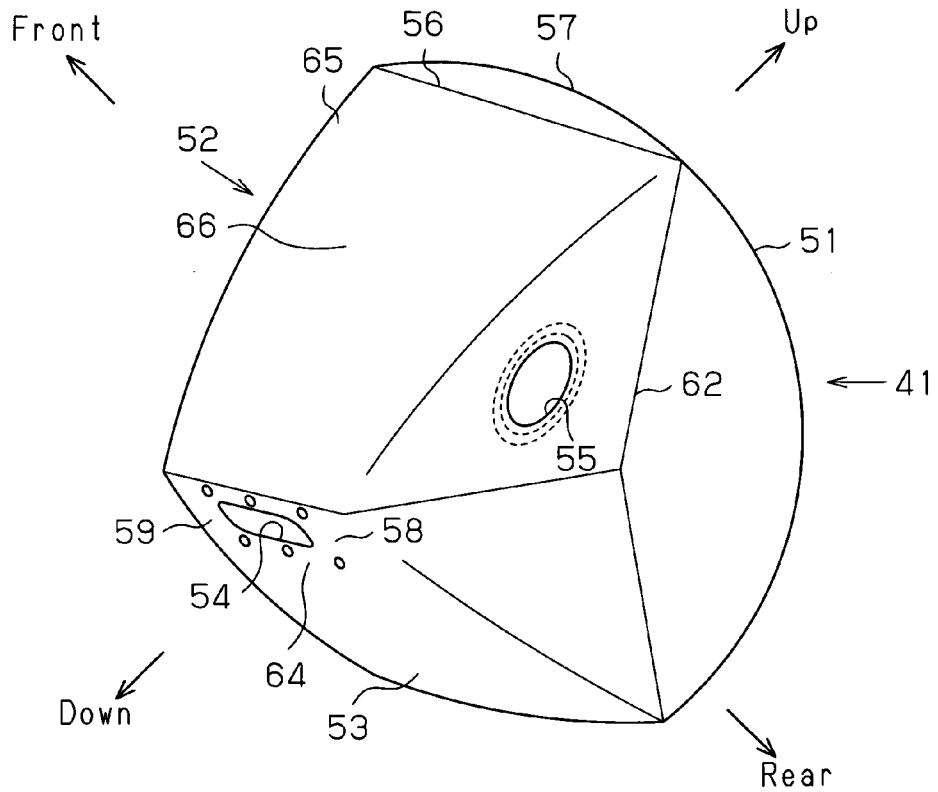
FIG. 13 is a perspective view illustrating a state where an airbag is inflated.
Figure 14:
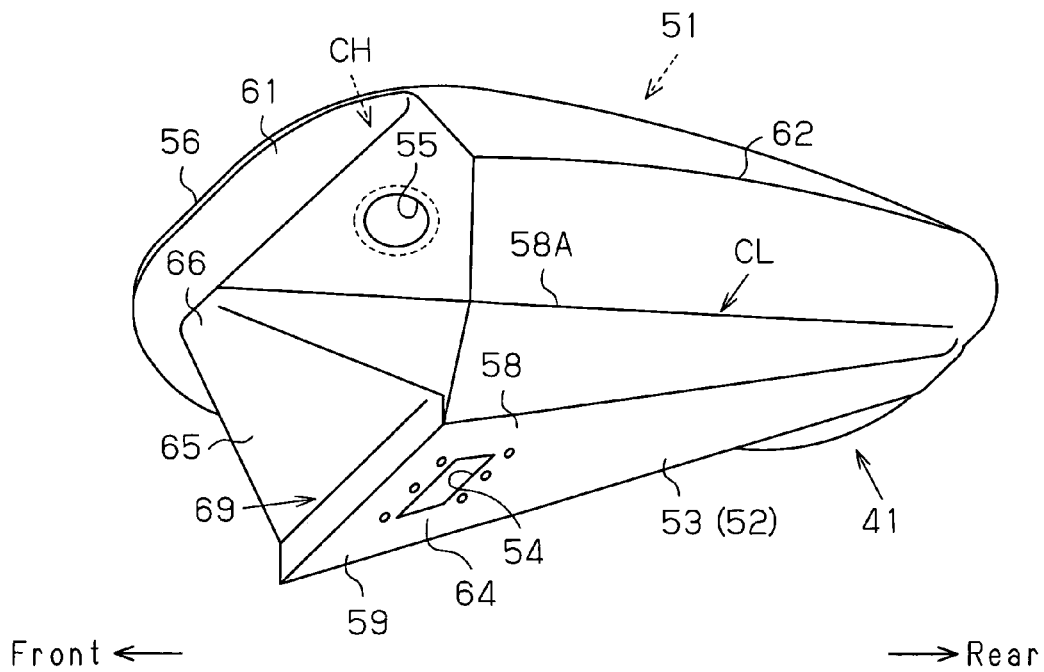
FIG. 14 is a perspective view showing the relationship between the airbag and folding lines for folding the airbag in a preliminary folding process.

FIG. 13 shows the airbag 41, which is subjected to folding processes. Specifically, FIG. 13 shows a state where the airbag 41 is completely deployed and inflated. As shown in FIG. 13, the airbag 41 includes an occupant-facing wall 51 and a peripheral wall 52. The occupant-facing wall 51 is arranged along the vertical direction and located in front of the occupant P in the front passenger seat. The peripheral wall 52 is substantially formed as a cone with its size decreasing from the outer edge of the occupant-facing wall 51 toward the front of the vehicle. In the peripheral wall 52, a part that is at the bottom when the airbag 41 is completely deployed and inflated is referred to as a lower peripheral wall 53. A gas inlet 54 is formed in the front portion of the lower peripheral wall 53 to guide inflation gas from the inflator 42 into the airbag 41.

The airbag 41 is fastened to the case 43 by bolts 46 and nuts 47 around the gas inlet 54. As shown in FIG. 13, a vent hole 55 for discharging excessive inflation gas is formed in each of the left and side faces of the peripheral wall 52 (only the left face is shown in FIG. 13).

The airbag 41 is folded into the shape shown in FIG. 12 through a preliminary folding process and subsequent lateral folding process and vertical folding process. The processes will now be described.

<Preliminary Folding Process>

Figure 15:
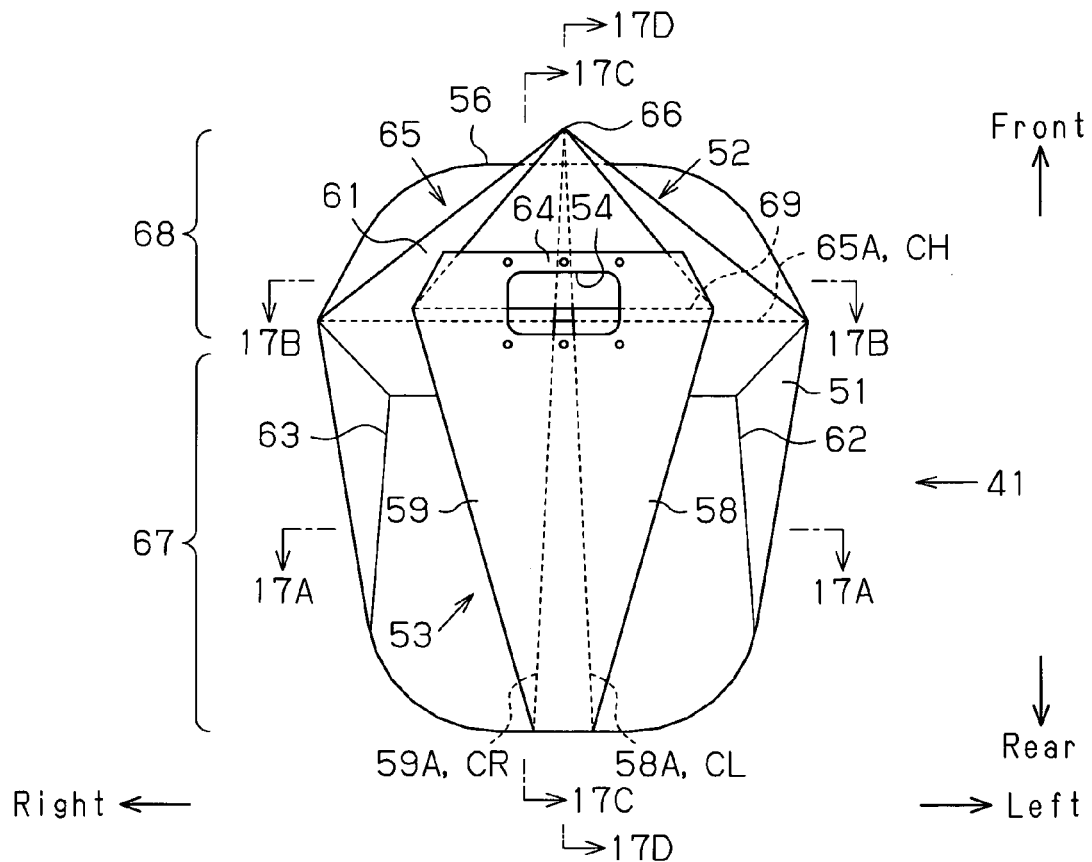
FIG. 15 is a bottom view illustrating the airbag after the preliminary folding process, as viewed from the side of gas inlet.
Figure 16:
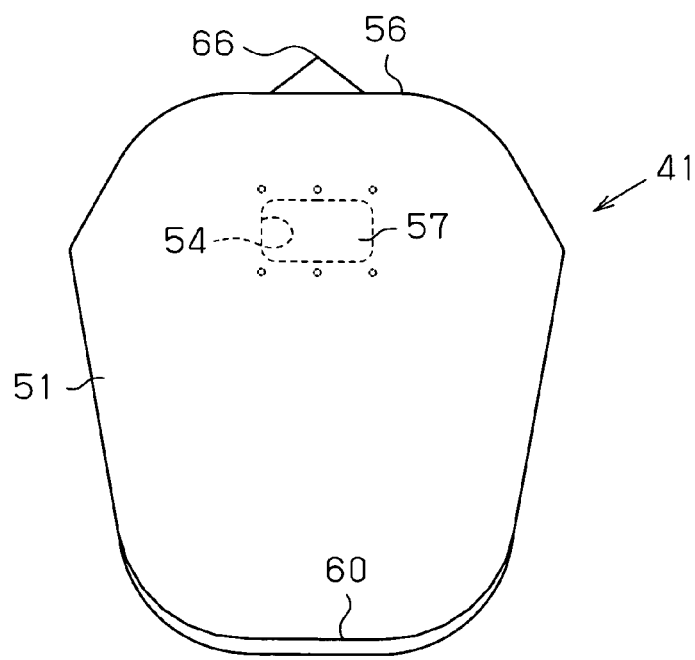
FIG. 16 is a plan view of the airbag as viewed from the side of an occupant-side wall, illustrating the airbag after the preliminary folding process.
Figure 17A:
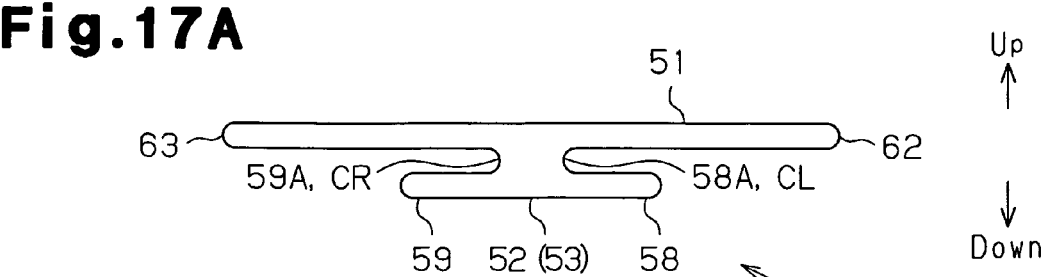
FIG. 17(A) is a cross-sectional view taken along line 17A-17A of FIG. 15.
Figure 17B:
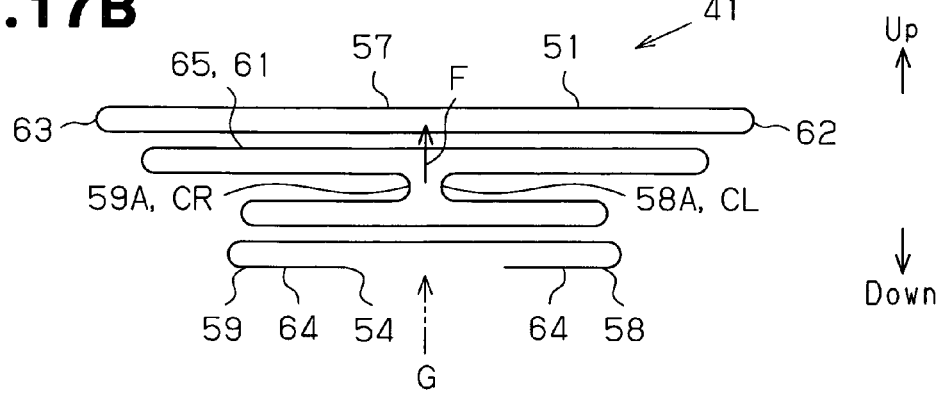
FIG. 17(B) is a cross-sectional view taken along line 17B-17B of FIG. 15.
Figure 17C:
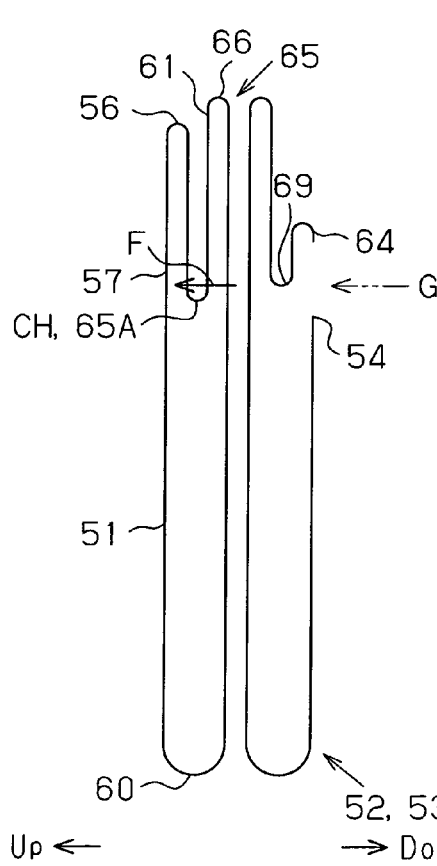
FIG. 17(C) is a cross-sectional view taken along line 17C-17C of FIG. 15.
Figure 17D:
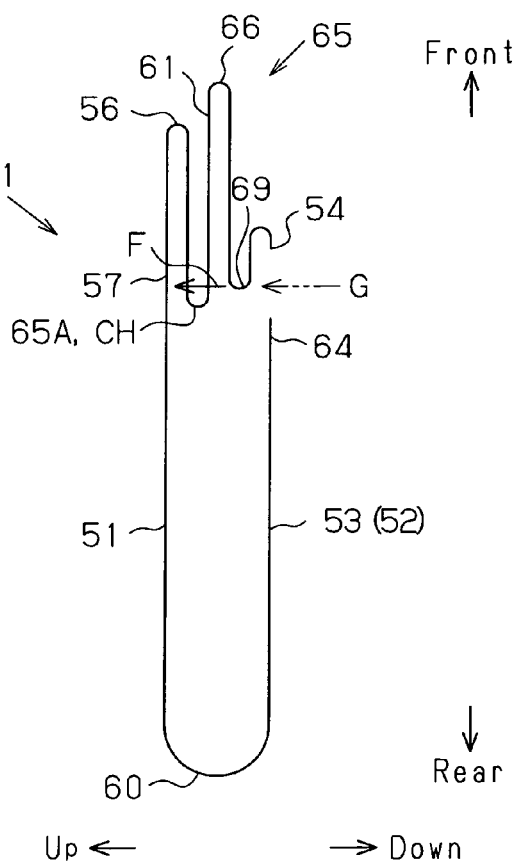
FIG. 17(D) is a cross-sectional view taken along line 17D-17D of FIG. 15.

Through the preliminary folding process, the airbag 41 is ultimately folded into a transitional form shown in FIGS. 15 and 16. In the preliminary folding process, the occupant-facing wall 51 is flatly overlapped onto the lower peripheral wall 53 of the peripheral wall 52, such that a section 57 of the occupant-facing wall 51 in the vicinity of an upper edge 56 is located above the gas inlet 54 (see FIGS. 16, 17(D)). At this time, although the peripheral wall 52 is folded, almost the entire occupant-facing wall 51 is spread flat and not folded. Almost the entire occupant-facing wall 51 includes the entire occupant-facing wall 51 except for sections in the vicinity of left and right edges 62 and 63 of the occupant-facing wall 51.

When folding the peripheral wall 52 in the above described manner, a left side section 58 and a right section 59 of the gas inlet 54, and a section 61 in the vicinity of the upper edge 56 of the occupant-facing wall 51 are folded as shown in FIGS. 15 to 17, while forming folding lines CL, CR, CH of valley folding.

The left side section 58 and the right side section 59 are folded such that a section 58A, which is substantially at the intermediate position between the left side section 58 and the left edge 62 of the flatly spread occupant-facing wall 51, and a section 59A, which is substantially at the intermediate position between the right side section 59 and the right edge 63 of the flatly spread occupant-facing wall 51, are close to the gas inlet 54 (such that folding lines CL and CR are brought close to each other). The left side section 58 and the right side section 59 are then tucked in while forming the valley folding lines CL, CR extending in the front-rear direction, in a state where the sections 58A, 59A are located closer to the occupant-facing wall 51 than to the edge 64 of the gas inlet 54.

In the peripheral wall 52, a part that is at the top when the airbag 41 is completely deployed and inflated is referred to as an upper peripheral wall 65. The section 61 of the peripheral wall 52, which is in the vicinity of the upper edge 56 of the occupant-facing wall 51, is folded such that a section 65A, which is substantially at the intermediate position between a front apex 66 of the folding lines CL, CR in the upper peripheral wall 65 and the upper edge 56 of the occupant-facing wall 51, is brought close to the gas inlet 54. A portion between the apex 66 and the upper edge 56 is tucked in while forming a valley folding line CH extending in the left-right direction, such that the section 65A is located closer to the occupant-facing wall 51 than to the edge 64 of the gas inlet 54.

In this manner, the peripheral wall 52 of the airbag 41 is folded into a bilaterally symmetric shape with respect to the gas inlet 54.

<Lateral Folding Process>

To distinguish sections of the airbag 41 after the preliminary folding process, a portion rearward of the gas inlet 54 is referred to as a rear portion 67, and a portion forward of the gas inlet 54 is referred to as a front portion 68, as shown in FIG. 15.

Figure 18A:
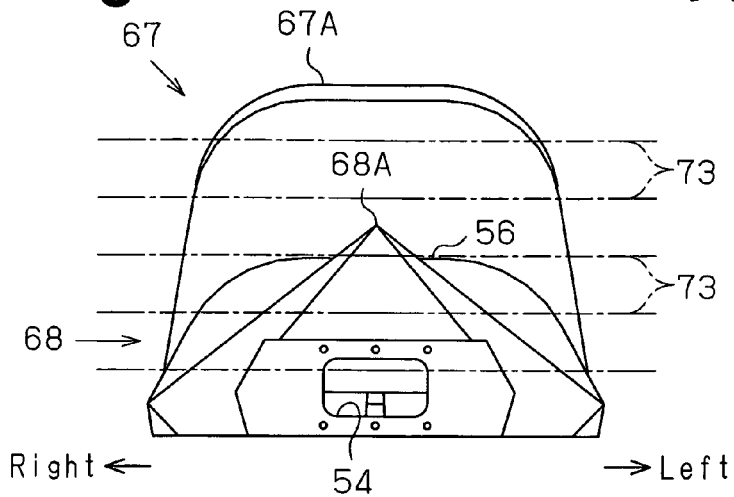
FIG. 18(A) is a bottom view illustrating the airbag during a lateral folding process.
Figure 18B:
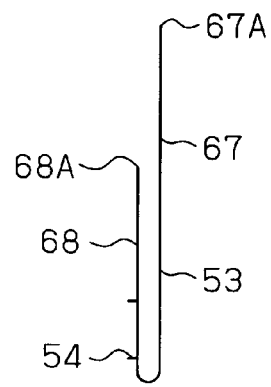
FIG. 18(B) is a diagrammatic side view of FIG. 18(A)

In the lateral folding process, the airbag 41 in the transitional form as shown in FIGS. 18(A) and 18(B) is first folded in half at the boundary between the rear portion 67 and the front portion 68, such that the gas inlet 54 is exposed.

Figure 18C:
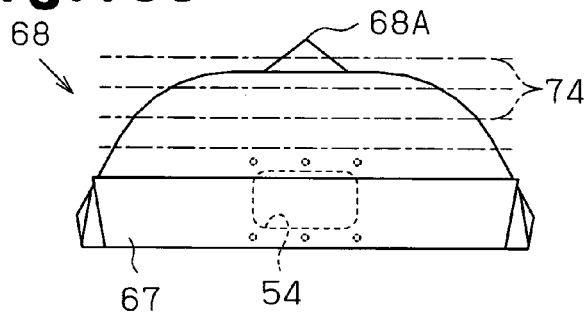
FIG. 18(C) is a plan view illustrating the airbag during the lateral folding process.

Subsequently, as shown in FIG. 18(A), multiple folding lines 73, which extend in the left and right direction in the drawing, are set in the rear portion 67. Also, as shown in FIG. 18(C), multiple folding lines 74, which extend in the left and right direction in the drawing, are set in the front portion 68. FIGS. 18(A) and 18(C) show the airbag 41 as viewed in opposite directions. That is, FIG. 18(A) shows a state of the airbag 41 as viewed from the side corresponding to the gas inlet 54, while FIG. 18(C) shows a state of the airbag 41 as viewed from the side opposite to the gas inlet 54 (from the side corresponding to the occupant-facing wall 51).

Figure 18D:
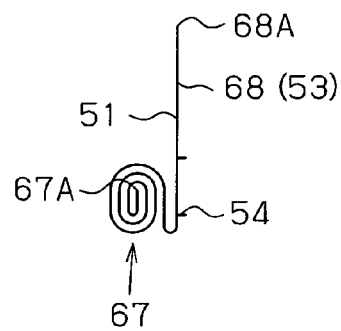
FIG. 18(D) is a diagrammatic side view of FIG. 18(C)

The rear portion 67 and the front portion 68 are folded (laterally folded) along the folding lines 73, 74, an end 67A of the rear portion 67 and an end 68A of the front portion 68 are brought close to the gas inlet 54. In the third embodiment, as shown in FIGS. 18(A) and 18(D), the rear portion 67 is folded in a rolling fashion (roll folded) along the folding lines 73, so as to wrap the end 67A with the remaining portion. The thus rolled rear portion 67 is located above and in the vicinity of the occupant-facing wall 51.

Figure 18E:
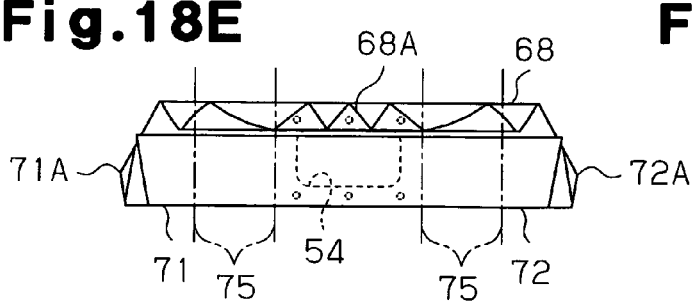
FIG. 18(E) is a plan view illustrating the airbag during the lateral folding process.
Figure 18F:
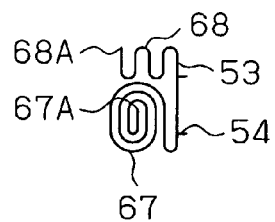
FIG. 18(F) is a diagrammatic side view of FIG. 18(E)

As shown in FIGS. 18(C) and 18(F), the front portion 68 is folded along the folding lines 74 at constant intervals while alternately changing the folding direction, so as to form a bellows (bellows folding). The bellows-like front portion 68 is located forward and in the vicinity of the rolled rear portion 67 (upward as viewed in FIGS. 18(E) and 18(F)). The manner of folding along the folding lines 73, 74 is not limited to that described in the present embodiment.

<Vertical Folding Process>

To distinguish sections of the airbag 41 after the lateral folding process, a portion left of the gas inlet 54 is referred to as a left portion 71, and a portion right of the gas inlet 54 is referred to as a right portion 72, as shown in FIG. 18(E).

Then, as shown in FIG. 18(E), multiple folding lines 75 extending vertically as viewed in the drawing are set in the left portion 71 and the right portion 72. The left portion 71 and the right portion 72 are folded (vertically folded) along the folding lines 75, so that an end 71A of the left portion 71 and an end 72A of the right portion 72 are brought close to the gas inlet 54.

Figure 18G:
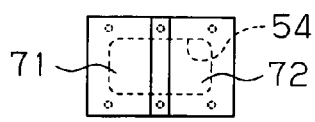
FIG. 18(G) is a plan view illustrating the airbag after the vertical folding process.
Figure 18H:
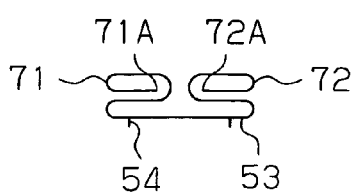
FIG. 18(H) is a diagrammatic front view of FIG. 18(G)

In the third embodiment, as shown in FIGS. 18(G) and 18(H), portions of the left portion 71 and the right portion 72 in the vicinity of the ends 71A, 72A are folded into bellows forms after being folded back to the side of the lower peripheral wall 53, and then placed on the occupant-facing wall 51. The manner of folding along the folding line 75 is not limited to that described in the present embodiment.

Through the vertical folding process, the folding of the airbag 41 is completed.

When an impact due to a frontal collision applied to the vehicle that mounts the airbag 41, which is folded in the above described manner, inflation gas from the inflator 42 is supplied to the airbag 41 through the gas inlet 54. At this time, in the airbag 41, the section 57 of the occupant-facing wall 51, which is close to the upper edge 56, is located above the gas inlet 54 so as to face the gas inlet 54 as shown in FIGS. 17(A) to 17(D). Accordingly, the section 57 of the occupant-facing wall 51, which faces the gas inlet 54, is strongly pushed upward by a pressure F of the inflation gas G at the initial stage of the gas inflow (refer to FIGS. 17(B) to 17(D)), before the other portions of the occupant-facing wall 51 (for example, the lower edge 60) are pushed upward. This allows the airbag 41 to be quickly unfolded, so that the occupant-facing wall 51 to be widely deployed.

The pressure F of the inflation gas G acts on a valley-folded section 69 of the peripheral wall 52, the section 61 (section 65A) close to the upper edge 56, and the section 57 of the upper edge 56 of the occupant-facing wall 51 between the left and right sections 58A, 59A of the peripheral wall 52. The inflation gas G inflates and deploys the airbag 41 while unfolding the lateral folding and the vertical folding, so that the airbag 41 presses the door portions 24F, 24R. At this time, the force by which the airbag 41 presses the door portions 24F, 24R varies depending on the manner in which the airbag 41 is unfolded, that is, on the manner in which the airbag 41 is folded when being accommodated. When the airbag 41, which is folded in the manner described in the present embodiment, is inflated and unfolded, the pressing force applied to the transverse breakable portions 21, the front-rear breakable portions 22, and the middle breakable portion 23 is decreased in this order. As a result, combined with the variation of the breaking strengths caused by different lengths B1 to B3 of the recesses depending on sections in the split-opening portion 14, the split-opening portion 14 is reliably broken in the order of the transverse breakable portions 21, the front-rear breakable portions 22, and the middle breakable portion 23. Ultimately, the occupant-facing wall 51 is arranged along the vertical direction (refer to FIGS. 12 and 13).

In the present embodiment, substantially the entire occupant-facing wall 51 is spread flat in the preliminary folding process of the airbag 41. Therefore, compared to a case where the occupant-facing wall 51 is folded, the airbag 41 is smoothly moved toward the occupant P while being widely deployed vertically and laterally, thereby further reducing the moving speed of the occupant-facing wall 51 toward the occupant P.

Thus, the third embodiment has the following advantage in addition to the advantage (1) explained above.

(5) In the first embodiment, the manner in which sections (the transverse breakable portions 21, the front-rear breakable portions 22, and the middle breakable portion 23) of the split-opening portion 14 can vary depending on the ambient temperature of the base member 13 of the instrument panel and the material of the base member 13. This may cause sections of the split-opening portion 14 to be broken in an order different from that under normal temperature. The reason for this is believed to be that, for example, the manner in which inflation gas is discharged from the inflator 42 varies depending on the ambient temperature, and the hardness of the material of the base member 13 varies depending on the ambient temperature.

In addition to the configuration of the first embodiment, the airbag 41 of the present embodiment is folded such that, when the airbag 41 is inflated and unfolded, the pressing force acting on the transverse breakable portions 21, the front-rear breakable portions 22, and the middle breakable portion 23 is reduced in this order. Therefore, regardless of the ambient temperature and the material of the base member 13, the split-opening portion 14 is reliably broken in the order of the transverse breakable portion 21, the front-rear breakable portions 22, and the middle breakable portion 23, so that the advantage (1) is reliably achieved.

The present invention may be embodied in the following forms.

<Modifications to First and Second Embodiments>

The recesses 15 of the split-opening portion 14 may be replaced by holes that opens only on the back face of the base member 13.

The split-opening portion 14 may be formed by laser machining or ultrasonic machining after the base member 13 is molded.

The first embodiment may be combined with the second embodiment. That is, both of the lengths B1 to B3 and the depths D1 to D3 of the recesses 15 may be set such that the ratios R1 to R3 of the recesses 15 per unit volume of the breakable portions are reduced in the order of the transverse breakable portions 21, the front-rear breakable portion 22, and the middle breakable portions 23. This configuration increases the number of possible settings compared to the case where either the lengths B1 to B3 or the depths D1 to D3 are varied to vary the ratios R1 to R3.

The airbag cover 31 (the frame portion 32 and the door support portions 33F, 33R may be joined to the base member 13 (the door adjacent portion 26 and the door portions 24F, 24R) by method other than vibration welding, for example, by using adhesive such as a hot-melt adhesive.

The door adjacent portion 26 and the frame portion 32 may be joined in the entirely or only in some sections in the contacting area between these. The same applies to the contacting area between the door portions 24F, 24R and the door support portions 33F, 33R.

The two transverse breakable portions 21 and the two front-rear breakable portions 22 may be connected to each other to form a closed shape other than a substantially rectangular shape.

<Modification to Third Embodiment>

The order of the lateral folding process and the vertical folding process in the third embodiment may be reversed. That is, the vertical folding process may be performed first, and then the lateral folding process may be performed.

After the preliminary folding process, the vertical folding process may be performed in the middle of the lateral folding process, and then the lateral folding process may be resumed. Alternatively, after the preliminary folding process, the vertical folding process may be performed. In the middle of the vertical folding process, the lateral folding process may be performed, and then the vertical folding process may be resumed.

The manner in which the airbag 41 is folded according to the third embodiment may be combined with the second embodiment (in which the depths D1 to D3 of the recesses 15 of the split-opening portion 14 are varied according to sections).

If the ambient temperature of the base member 13 and the material of the base member 13 do not significantly influence the manner in which sections of the split-opening portion 14 are broken, or if the influence of these factors can be reduced by other means, the airbag 41 may be folded by the folding method described in the third embodiment. In this case, the split-opening portion 14 can be broken in the order of the transverse breakable portions 21, the front-rear breakable portions 22, and the middle breakable portion 23 only by selecting the method in which the airbag 41 is folded, without differentiating the lengths B1 to B3 or the depths D1 to D3 of the recesses 15 according to sections as in the first and second embodiments.

Therefore, the present examples and embodiments are to be considered as illustrative and not restrictive and the invention is not to be limited to the details given herein, but may be modified within the scope and equivalence of the appended claims.

What is claimed is:

1. A front passenger seat airbag apparatus comprising:
   a split-opening portion formed in a base member of a vehicle instrument panel that corresponds to a front passenger seat, the split opening portion being formed by two transverse breakable portions that are arranged along a front-rear direction of the vehicle and extend substantially along a transverse direction of the vehicle, two front-rear breakable portions that are arranged along the transverse direction of the vehicle and extend substantially along the front-rear direction of the vehicle, and a middle breakable portion that is located between the two transverse breakable portions and extends substantially along the transverse direction of the vehicle, wherein the two transverse breakable portions and the two front-rear breakable portions are connected to each other to form a closed shape, and the middle breakable portion is connected to the front-rear breakable portions, so as to divide the closed shape;
   a pair of door portions formed by two portions of the base member that are surrounded by the transverse breakable portions and the front-rear breakable portions, the two portions being front and rear parts delineated by the middle breakable portion;
   a door adjacent portion formed by a part of the base member that is outside of and adjacent to the split-opening portion;
   a frame portion supporting the door adjacent portion; and
   a pair of door support portions arranged along the front-rear direction in the frame portion, the pair of door support portions being coupled to the frame portion with a pair of hinge portions, wherein each of the pair of door support portions supports one of the pair of door portions,
   wherein the pair of door portions allow the split-opening portion to be broken by pressing force of an inflated airbag so that the split-opening portion is separated from the door adjacent portion, and the pair of door support portions are pivoted together with the pair of door portions about the pair of hinge portions serving as fulcrums, and
   wherein the split-opening portion is broken in the order of the transverse breakable portions, the front-rear breakable portions, and the middle breakable portion.

2. The front passenger seat airbag apparatus according to claim 1, wherein the split-opening portion has a breaking strength that increases in the order of the transverse breakable portions, the front-rear breakable portions, and the middle breakable portion.

3. The front passenger seat airbag apparatus according to claim 2, wherein the split-opening portion is formed by thin portions and thick portions, which are alternately provided, each of the thin portion having a recess, and each of the thick portions having no recess, and
   wherein the ratios of the volume of the recesses per unit volume of the transverse breakable portions, the front-rear breakable portions, and the middle breakable portion are varied, so as to set the breaking strengths of the breakable portions.

4. The front passenger seat airbag apparatus according to claim 3, wherein lengths of the thick portions in the transverse breakable portions, the front-rear breakable portions, and the middle breakable portions are the same, and
   wherein each recess is a groove, lengths of the recesses are set to be decreased in the order of the transverse breakable portions, the front-rear breakable portions, and the middle breakable portion.

5. The front passenger seat airbag apparatus according to claim 3, wherein depths of the recesses are set to be decreased in the order of the transverse breakable portions, the front-rear breakable portions, and the middle breakable portion.

6. The front passenger seat airbag apparatus according to claim 1, wherein the airbag is accommodated in a folded state before being inflated, and the airbag is unfolded while pressing the base member when being inflated, and
   wherein, when the airbag is inflated, a pressing force is decreased in the order of the transverse breakable portions, the front-rear breakable portions, and the middle breakable portion.

* * * * *